US009256753B2

(12) United States Patent
Sawicki et al.

(10) Patent No.: US 9,256,753 B2
(45) Date of Patent: Feb. 9, 2016

(54) METHOD AND APPARATUS FOR PROTECTING REGIONS OF AN ELECTRONIC DOCUMENT

(75) Inventors: Marcin Sawicki, Kirkland, WA (US); Katsuhiro A. Namba, Seattle, WA (US); Brian Jones, Redmond, WA (US); Christopher Pratley, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1009 days.

(21) Appl. No.: 10/459,089

(22) Filed: Jun. 11, 2003

(65) Prior Publication Data

US 2009/0150761 A1    Jun. 11, 2009

(51) Int. Cl.
*G06F 21/10* (2013.01)
*G06F 21/62* (2013.01)
*G06F 17/24* (2006.01)

(52) U.S. Cl.
CPC ............ *G06F 21/6209* (2013.01); *G06F 17/24* (2013.01); *G06F 21/10* (2013.01); *G06F 2221/2147* (2013.01)

(58) Field of Classification Search
CPC . G06F 21/6218; G06F 21/6209; G06F 21/62; G06F 21/10; G06F 21/00; G06F 2221/0768; G06F 21/121; G06F 21/128; G06F 21/629; G06F 3/1238
USPC ...................................................... 726/26–33
See application file for complete search history.

(56) References Cited

U.S. PATENT DOCUMENTS

| 5,634,012 | A | * | 5/1997 | Stefik et al. ...................... 705/39 |
| 5,638,443 | A | * | 6/1997 | Stefik et al. ...................... 705/54 |
| 5,745,910 | A | * | 4/1998 | Piersol et al. ................. 715/515 |
| 5,892,900 | A | * | 4/1999 | Ginter et al. .................... 726/26 |
| 6,289,458 | B1 | | 9/2001 | Garg et al. ..................... 713/200 |
| 6,345,361 | B1 | | 2/2002 | Jerger et al. ................... 713/200 |

(Continued)

FOREIGN PATENT DOCUMENTS

| EP | 1 037 157 A1 | 9/2000 |
| EP | 1 187 035 A1 | 3/2002 |

(Continued)

OTHER PUBLICATIONS

Kudo, M.; Hada, S., "*XML Document Security Based on Provisional Authorization*," 7th ACM Conference on Computer Communications Security, Athens Greece, Proceedings of the ACM Conference on Computer and Communications Security 2000, p. 87-96, Nov. 2000.

(Continued)

*Primary Examiner* — Tamara T Kyle
(74) *Attorney, Agent, or Firm* — Tom Wong; Jessica Meyers; Micky Minhas

(57) ABSTRACT

A method and apparatus for protecting regions of an electronic document are provided. According to the method, the entire electronic document is protected. The selection of a region within the electronic document is received along with identity of one or more users authorized to freely edit the selected region. The identified users are authorized to freely edit only the selected region of the electronic document. A request is then received to edit a region of the electronic document from a current user. In response to the request, a determination is made as to whether the current user is authorized to edit the region. If the user is not authorized to edit the region, the request is denied.

20 Claims, 19 Drawing Sheets

(56) References Cited

U.S. PATENT DOCUMENTS

| | | | |
|---|---|---|---|
| 7,113,999 B2* | 9/2006 | Pestoni et al. | 709/231 |
| 7,424,030 B2* | 9/2008 | Subramanian et al. | 370/458 |
| 7,551,738 B2* | 6/2009 | Medvinsky et al. | 380/203 |
| 2002/0065848 A1* | 5/2002 | Walker et al. | 707/511 |
| 2002/0112171 A1* | 8/2002 | Ginter et al. | 713/185 |
| 2003/0142128 A1* | 7/2003 | Reulein et al. | 345/742 |
| 2003/0144982 A1* | 7/2003 | Reulein et al. | 707/1 |
| 2003/0149884 A1* | 8/2003 | Hernandez et al. | 713/193 |
| 2003/0182475 A1* | 9/2003 | Gimenez | G06F 21/10 710/8 |
| 2005/0039034 A1* | 2/2005 | Doyle et al. | 713/193 |
| 2005/0228752 A1* | 10/2005 | Konetski et al. | 705/51 |
| 2007/0156594 A1* | 7/2007 | McGucken | G06F 21/10 705/51 |
| 2007/0255965 A1* | 11/2007 | McGucken | G06F 21/10 713/193 |
| 2008/0086757 A1* | 4/2008 | Pestoni | 726/2 |
| 2010/0114739 A1* | 5/2010 | Johnston | 705/27 |

FOREIGN PATENT DOCUMENTS

| | | |
|---|---|---|
| JP | 02-089162 | 3/1990 |
| JP | 04-357551 | 12/1992 |
| JP | 05-334289 | 12/1993 |
| JP | 2003-050793 | 2/2003 |
| WO | 02/01271 A1 | 1/2002 |
| WO | WO 02/01271 A1 | 1/2002 |

OTHER PUBLICATIONS

European Search Report dated Nov. 22, 2007 cited in EP Application No. 04102462.1-1527.

EP communication dated Sep. 17, 2008.

Japanese Office Action dated Nov. 21, 2008 cited in Japanese Application No. 2004-174744.

Japanese Official Notice of Final Rejection dated Mar. 13, 2009 cited in Japanese Application No. 2004-174744.

European Summons dated Jul. 31, 2009 cited in Japanese Application No. 04102462.1.

Dominique Decouchant et al., "A Cooperative, Deductive, and Self-Adaptive Web Authoring Environment," MICAI 2000, LNAI, vol. 1793, pp. 443-457, 2000.

European Minutes dated Dec. 22, 2009 cited in Application No. 04 102 462.1-1527.

European Decision to Refuse dated Dec. 23, 2009 cited in Application No. 04 102 462.1-1527.

Chinese Decision on Rejection dated Jan. 8, 2010 cited in Application No. 200410048927.9.

Korean Notice of Preliminary Rejection dated Nov. 3, 2010 cited in Application No. 10-2004-42534.

Korean Office Action dated Jul. 29, 2011 cited in Application No. 10-2004-0042534.

Chinese Decision on Reexamination dated Aug. 31, 2011 cited in Application No. 200410048927.9.

Japanese Notice of Rejection dated Dec. 22, 2011 cited in Application No. 2009-164951, 4 pgs.

Japanese Notice of Rejection dated Sep. 7, 2012 cited in Appl. No. 2009-164951, 5 pgs.

Korean Trial Board's Decision dated Jun. 27, 2013 cited in Appl. No. 10-2004-0042534, 27 pgs.

Korean Notice of Final Rejection dated Mar. 29, 2012 cited in Application No. 10-2004-0042534, 5 pgs.

Japanese Final Rejection dated Apr. 12, 2013 cited in Appl. No. 2009-164951, 5 pgs.

India First Examination Report dated Jun. 19, 2015 in Application No. 920/DEL/2004, 2 pgs.

* cited by examiner

METHOD AND APPARATUS FOR PROTECTING REGIONS OF AN ELECTRONIC DOCUMENT

TECHNICAL FIELD

The invention generally relates to the field of document processing and, more specifically, to the field of protecting regions within an electronic document.

BACKGROUND OF THE INVENTION

One result of the advent and explosion of the Internet is that document processing has evolved from a task performed most often by a single user into a commonly collaborative effort in which a number of people are involved. For instance, a team of individuals may be responsible for preparing a document containing a business proposal, a presentation, or financial information contained in a spreadsheet. However, because the genesis of document processing typically involved a single user working on a single document, many of the current document creation and processing applications, such as word processors, spreadsheets, and presentation programs, do not contain robust tools for allowing multiple users to collaborate during the creation and editing of an electronic document. As a result, these tools make it very difficult for groups of people to effectively work together to create and edit electronic documents.

One limitation of current tools for document processing stems from the fact that different users often are responsible for different parts of the document. However, current applications for creating and processing electronic documents allow permissions to edit the document to be assigned only on a per document basis. As a result, a user may inadvertently change portions of the document for which they are not responsible. These changes may go unnoticed by the person actually responsible for the changed section and may result in the delivery of an incorrect document.

Another limitation of current document processing application programs result from the fact that restrictions cannot be placed on the identity of the users that are able to edit certain form fields. For instance, a form may be created within a word processing application program document that allows a user to request reimbursement for business expenses. Fields may exist within the form for identifying the business expense, the amount to be reimbursed, and for a supervisor's approval. However, current word processing application allow any user to fill in any of the form fields. The fields cannot be restricted to a particular user. For instance, the field for supervisor approval could be filled in by any user and not restricted to just supervisors.

One other limitation of current document processing application programs stems from the fact that users cannot be prohibited from editing certain hidden markup, such as extensible markup language ("XML") tags. Documents today can be marked up with XML tags to identify the structure of the document. However, users can freely edit the XML tags if they have the authority to edit the document. The XML tags are really just another type of content in the document, and may be edited freely. As a result, the user may be permitted to destroy the specified structure of the document set forth by the XML tags.

It is with respect to these considerations and others that the present invention has been made.

SUMMARY OF THE INVENTION

Generally described, embodiments of the invention relate to a method and apparatus for protecting regions within an electronic document. Regions within an electronic document may be protected so that only authorized users are permitted to edit the regions. Regions may be as small as one character, or smaller, and may include items that are typically hidden in most commonly used views, such as XML tags or formatting codes. The region may be just the contents of an XML tag, which initially is empty. The user can still type in the tag though since the contents (just an insertion point initially) are unlocked.

According to one aspect of the invention, a method is provided for protecting one or more regions within an electronic document. The electronic document may comprise a word processing document, a spreadsheet document, a presentation document, a rich form, or other type of electronic document. The entire document may be protected so that editing of the document is limited. For instance, the document may be protected so that the entire document is read-only, so that only comments may be added to the document, so that only forms within the document may be completed, or so that any changes made within the entire document are tracked and stored.

Once the entire document has been protected, the selection of a region within the electronic document may be received. The selection of a region within the electronic document may be provided by a user and the region may be as granular as a single character or no characters at all, just an insertion point. Once the selection of a region has been made, the identity of one or more users authorized to freely edit the selected region may also be received. For instance, a user or a group of users may be identified as individuals authorized to freely edit the selected region despite the protection that has been applied to the entire document. A selected user or groups may be then be authorized to freely edit the selected region of the electronic document. When a request is received to edit any region of the electronic document, a determination is made as to whether the user making the request is authorized to edit the region. If the user has not been authorized to edit the region, the request to edit will be denied and a user interface task pane will be displayed to the user providing various commands related to document protection. If the user is authorized to edit the region, then the request will be granted and the edit will be permitted.

In accordance with another aspect of the invention, a current user may request that the regions within the electronic document that the user is authorized to freely edit is identified. In response to such a request, the regions within the electronic document that the user is authorized to freely edit may be identified and shown to the user. Similarly, a request may be received from a user to identify the next region within the electronic document that the current user is authorized to freely edit. In response to such a request, the next region within the document that the user is authorized to freely edit may be located and displayed to the user.

According to another aspect of the invention, another method for protecting regions within an electronic document is provided. According to this method, a word processing application program is executed on a computer. The word processing application program is operative to provide an administrative mode and an enforcement mode. In the administrative mode, the word processing application program is operative to receive the selection of a region within the electronic document. The word processing application is also operative to receive the identities of one or more users authorized to freely edit the selected region.

In the enforcement mode, the word processing application program is operative to receive requests to edit regions of the electronic document and to deny requests to edit regions of the electronic document made by users not authorized to freely edit the selected region. In this manner, regions can be specified within an electronic document that may be only freely edited by specified users.

According to this method, the word processing application program is further operative to receive the selection of a protection scheme that is applied to the entire document. The protection scheme is identified while operating in the administrative mode. In the enforcement mode, the selected protection scheme is applied to the document. The protection scheme may include rendering the entire document read-only, allowing tracked edits to be freely made to the entire electronic document, allowing users to freely edit only form fields contained in the electronic document, or allowing only comments to be inserted into the electronic document, or preventing the user from seeing certain portions of the document. In this manner, a protection scheme may be applied to the entire document and edits may be permitted only when made by users that have been authorized to freely edit regions of the electronic document.

Other aspects of the invention relate to schema and data structures utilized for protecting regions of electronic documents. The invention may also be implemented as a computer process, a computing system, or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
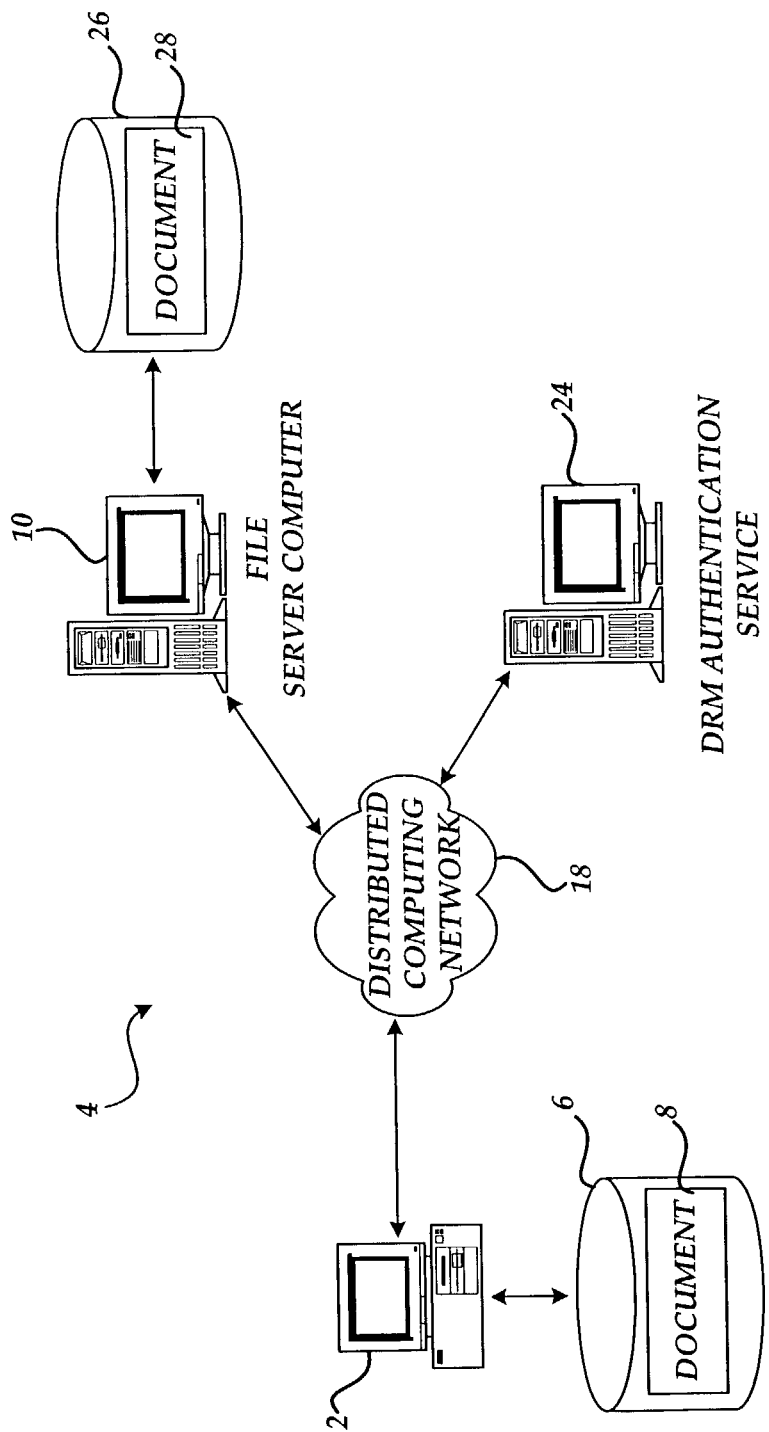
FIG. 1 is a network diagram illustrating a hardware architecture utilized by a system provided in one embodiment of the invention.

Referring now to the drawings, in which like numerals represent like elements, a computer hardware and software architecture utilized by a computer system provided in the various embodiments of the invention will be described. In particular, FIGS. 1 and 2 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative operating environment for embodiments of the invention will be described. As shown in FIG. 1, a client computer 2 is provided according to the various embodiments of the invention. The client computer 2 comprises a standard desktop or personal computer system capable of executing application programs. For instance, the client computer 2, in one embodiment of the invention, comprises a standard personal computer capable of executing a word processing application program. It should be appreciated that although the embodiments of the invention described herein are discussed in the context of a word processing application program, the invention may be similarly applied to other types of application programs for creating and editing electronic documents, such as spreadsheet application programs, presentation application programs, graphics editing programs, and any other type of application program for creating and editing electronic documents.

The client computer 2 may store electronic documents 28 in a database 6 maintained locally at the client computer 2. For instance, the word processing application program executing on the client computer 2 may store documents 8 on a hard disk drive contained within the client computer 2. Alternatively, the client computer 2 may be connected to a distributed computing network 18, such as a local area network ("LAN") or a wide area network ("WAN"). Through the network 18, the client computer 2 may communicate with a file server computer 10 at which electronic documents 28 may be stored. The file server computer 10 may comprise a standard server computer operative to maintain a database 26 storing one or more electronic documents 28. Alternatively, the file server computer may be operative to execute a file collaboration and management application program, such as the WINDOWS SHAREPOINT SERVICES application program from MICROSOFT CORPORATION of Redmond Wash. In either case, the client computer 2 may be operative to request and receive the documents 28 from the file server computer 10.

The client computer 2 may also connect through the network 18 to a digital rights management ("DRM") authentication service 24. As known to those skilled in the art, a DRM authentication service 24 may be utilized by the client computer 2 to verify the identity of a user of the client computer 2. As will be discussed in greater detail below, the client computer 2 may utilize information obtained from the DRM authentication service 24 to determine whether a user is authorized to edit a particular region within an electronic document. Additional details regarding the operation and configuration of the client computer 2 are provided below with respect to FIG. 2.

Figure 2:
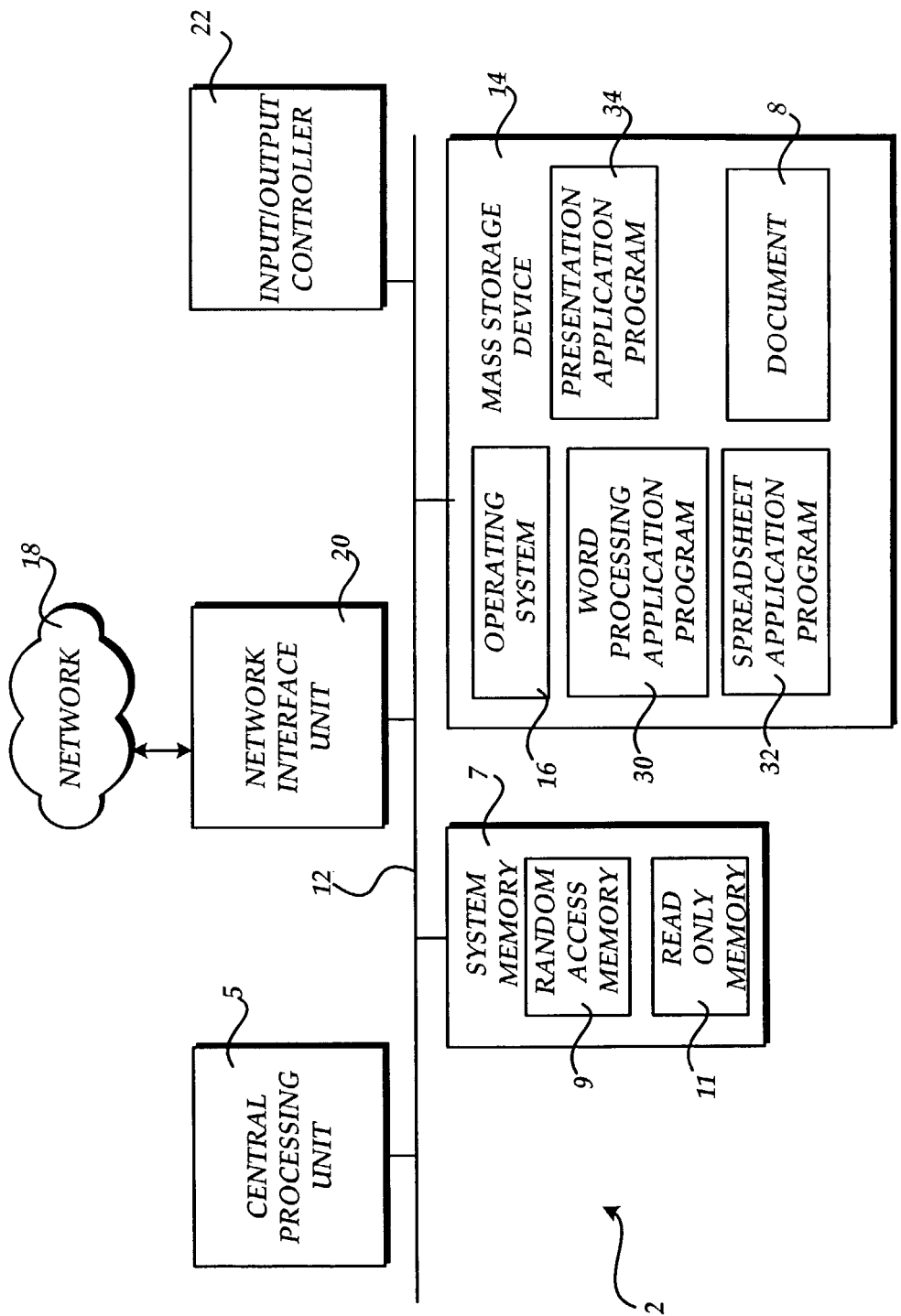
FIG. 2 is a computer architecture diagram illustrating a hardware and software architecture utilized by a client computer in one embodiment of the present invention.

Turning now to FIG. 2, an illustrative computer architecture for a client computer 2 utilized in the various embodiments of the invention will be described. The computer architecture shown in FIG. 2 illustrates a conventional desktop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The client computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the client computer 2 or the server computer 30, described below.

According to various embodiments of the invention, the client computer 2 may operate in a networked environment using logical connections to remote computers, such as the server computer 30, through a network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the client computer 2, including an operating system 16 suitable for controlling the operation of a networked personal computer, such as the WINDOWS XP operating system from MICROSOFT CORPORATION of Redmond, Wash.

The mass storage device 14 and RAM 9 may also store one or more program modules. In particular, the mass storage device 14 and the RAM 9 may store a word processing application program 30. As will be described in greater detail below, the word processing application program 30 comprises an application program for creating and editing word processing documents. The word processing application program 30 also includes functionality for protecting regions within the electronic documents 8 created by the application program 30. For instance, according to one embodiment of the invention, the word processing application program 30 comprises the MICROSOFT WORD word processing application program from MICROSOFT CORPORATION of Redmond, Wash. It should be appreciated that the embodiments of the invention are applicable to word processing application programs from other vendors and executing on other operating systems.

The mass storage device 14 and RAM 9 may also store a spreadsheet application program 32, a presentation application program 34, and other types of application programs. As discussed briefly above, the various aspects of the invention described herein are equally application to these types of application programs. In particular, any program that is utilized to create and edit documents that may be utilized by more than one person may benefit from the various features of the present invention described herein.

Figure 3A:
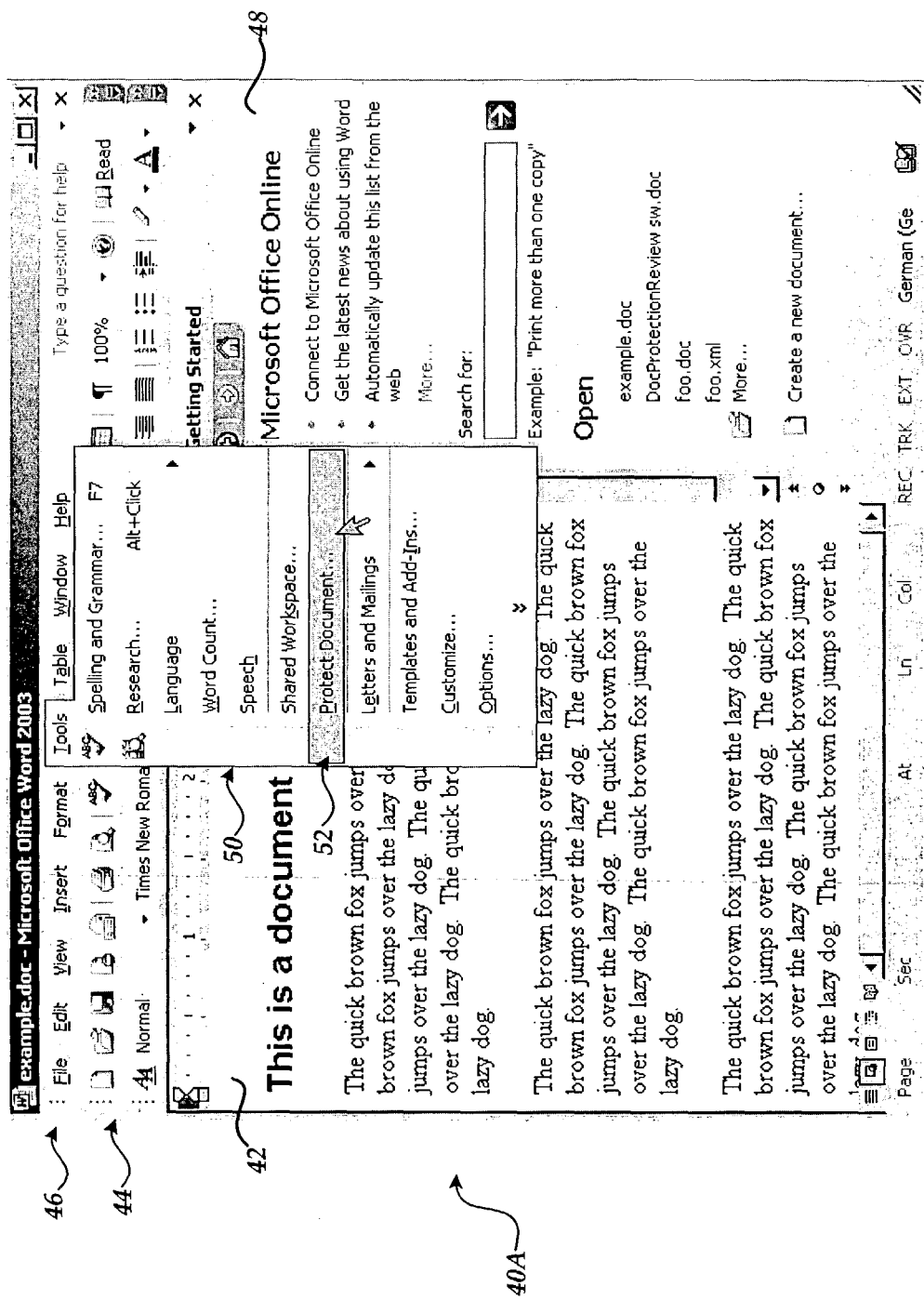
FIGS. 3A-14 are screen diagrams illustrating various aspects of a user interface provided in the various embodiments of the present invention.

Referring now to FIG. 3A, aspects of a screen display 40A provided by a word processing application program 30 will be described. As shown in FIG. 3A, the screen display 40 comprises a user interface for controlling the operation of and interacting with a word processing application program 30. In particular, the screen display 40A includes a document workspace 42 in which the electronic document currently being edited may be displayed. The document shown in the document workspace 42 may include one or more regions. As described herein, the term regions may comprise any subset of an entire electronic document as small as one individual character. It should be appreciated that the document workspace 42 may display text, graphics, and other information contained within the electronic document.

As shown in FIG. 3A, the screen display 40A also includes a tool bar 44 and a menu bar 46. As known to those skilled in the art, the tool bar 44 and menu bar 46 may be utilized by a user of the word processing application program 30 to perform various editing functions. According to one embodiment of the invention, a menu 50 available through the menu bar 46 includes a menu item 52 for protecting regions within the electronic document 8. As will be described in greater detail below, when selected, the menu item 52 causes the word processing application program 30 to enter an administration mode. In the administration mode, a user can protect the entire electronic document 8 and select regions within the electronic document 8 which may be freely edited by specified users. Additional details regarding the operation of the administration mode will be provided in greater detail below.

Figure 3B:
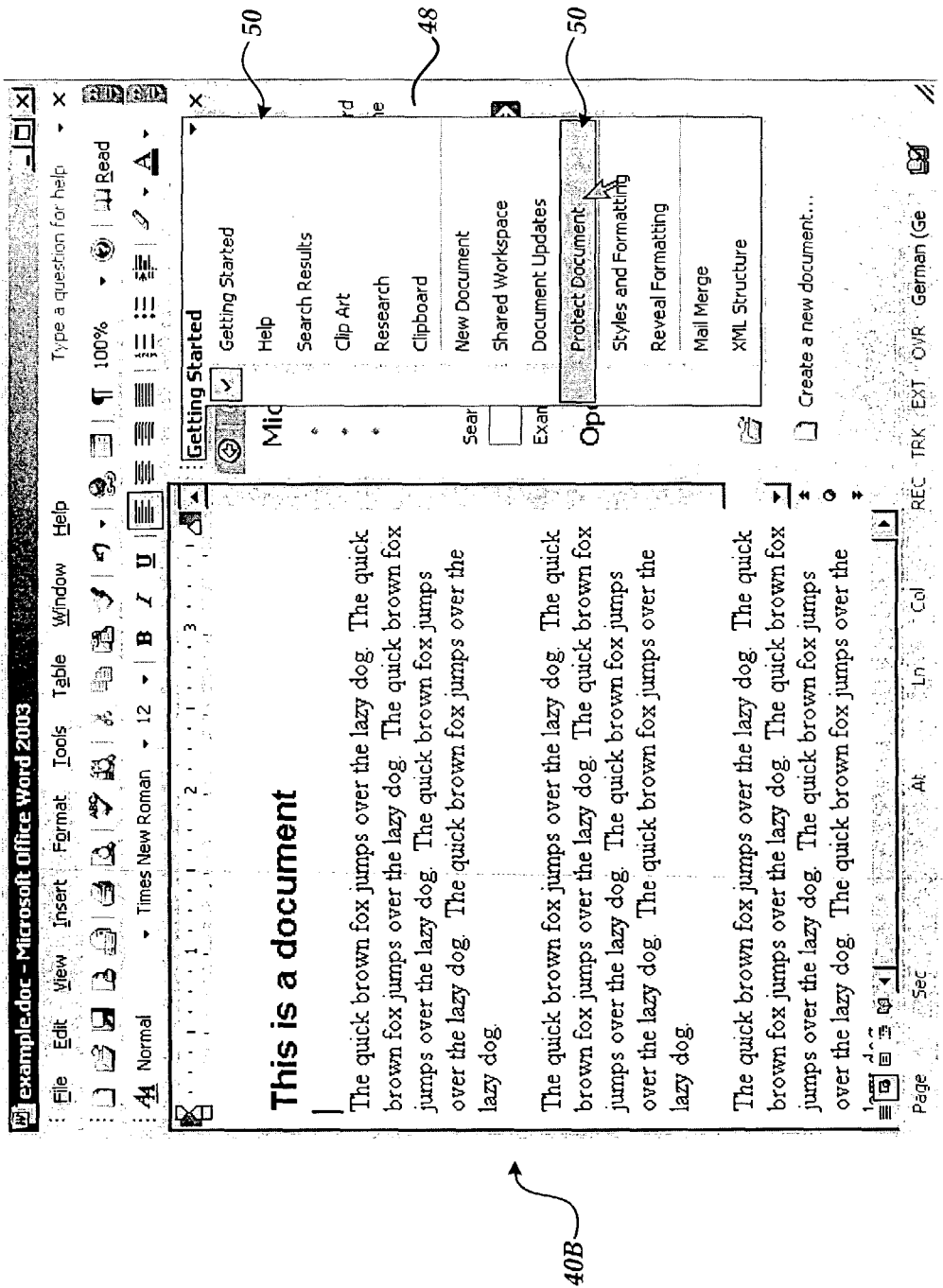

According to various embodiments of the invention, the word processing application program 30 may also provide a task pane 48 as part of the initial graphical user interface displayed to a user. The task pane 48 may be utilized by a user to perform various functions, including protecting regions within the electronic document 8. As shown in FIG. 3B, the task pane 48 may also provide a menu 50 containing various menu items, including a menu item 52 for protecting the document 8. The functionality provided by the menu item 52 shown in FIG. 3B is identical to that described above with respect to FIG. 3A. The menu 50 provided through the task pane 48 is simply another way for a user to cause the word processing application program 30 to enter the administration mode.

Figure 4A:
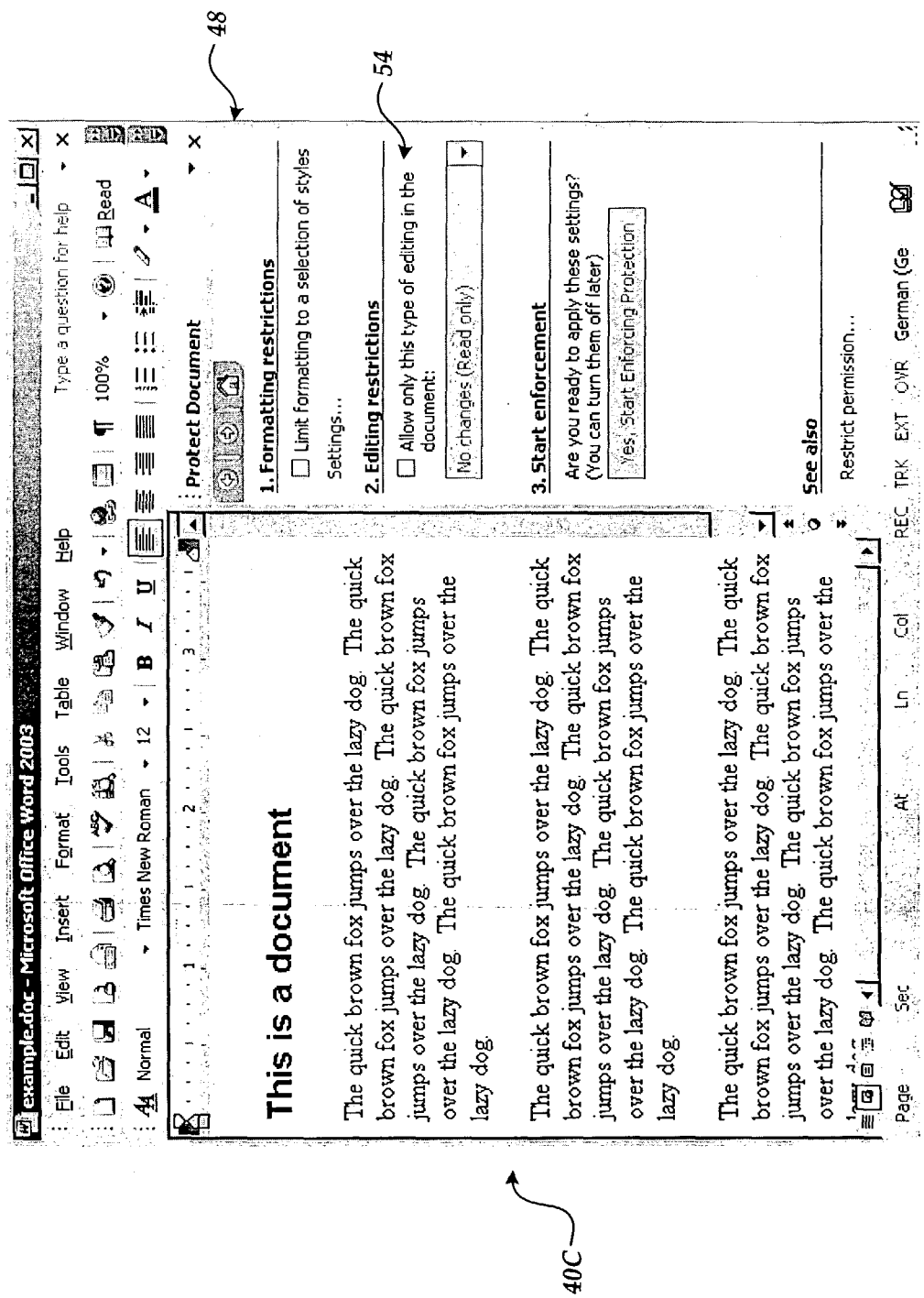

Once a user has selected the menu item 52 for protecting the electronic document 8, the word processing application program 30 enters the administration mode where the task pane 48 displays a set of options related to protecting the electronic document. As shown in FIG. 4A, the options include an editing restrictions option 54. When selected, the editing restrictions option 54 allows a user to specify a protection scheme that should be applied to the entire document, and then to identify users or groups of users authorized to override the protection scheme and to edit various regions within the electronic document.

Figure 4B:
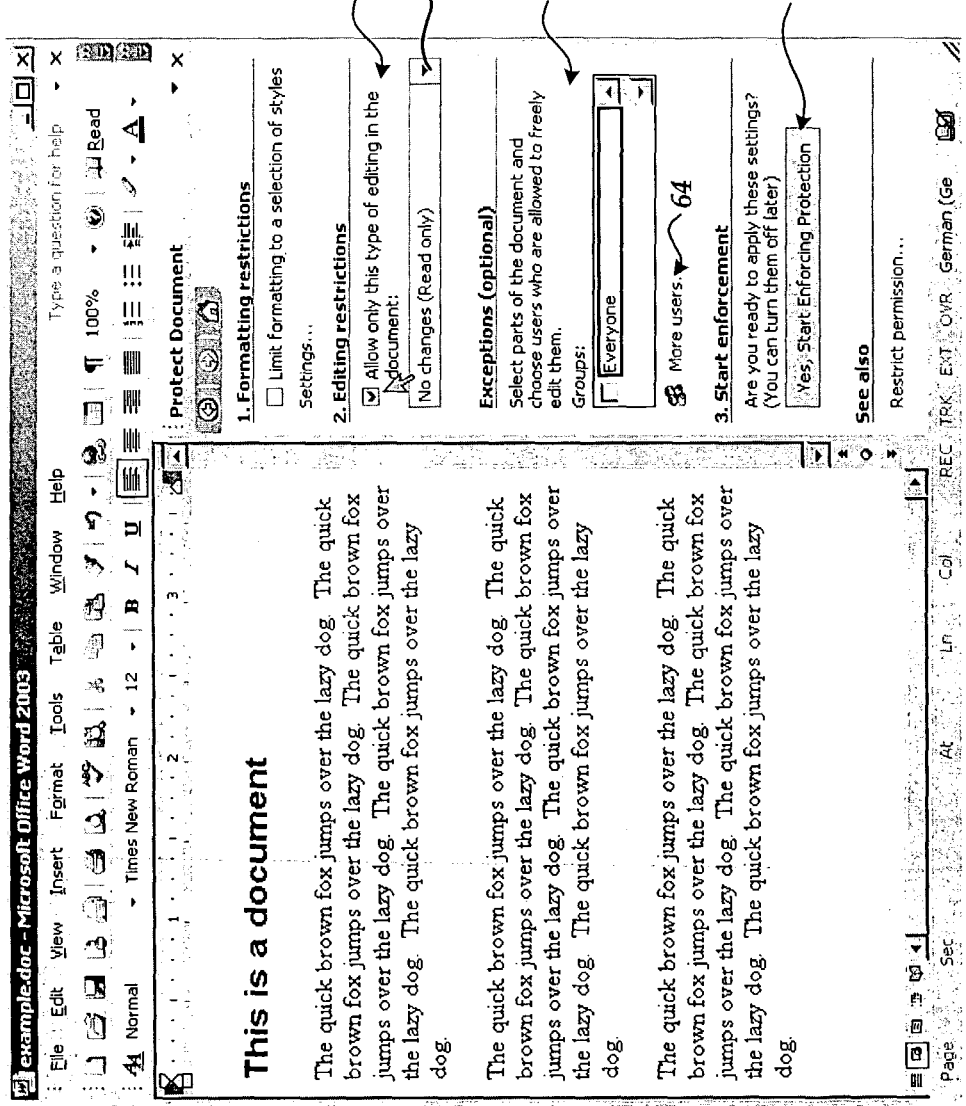

As shown in FIG. 4B, when the editing restrictions option 54 has been checked by a user, a pull-down menu 58 and an exceptions option 56 become active. Through the pull-down menu 58, a user can specify a protection scheme that should be applied to the entire document. Additional details regarding the pull-down menu 58 and the application of a protection scheme are provided in greater detail below with respect to FIG. 11.

The exceptions option 56 also becomes available once a user has selected the editing restrictions option 54. Through the exceptions option 56, the current user can select regions within the document and then choose users or groups of users that are allowed to freely edit the regions. In this manner, the selected users or groups of users can edit the selected regions of the document despite the protection scheme that has been applied to the entire document.

When the editing restrictions option 54 has been selected, a button 60 for starting the enforcement of the protection also becomes available. As will be described in greater detail below, when the button 60 is selected, the word processing application program 30 enters an enforcement mode in which the options set through the editing restrictions option 54 are enforced. In particular, the protection scheme selected through the pull-down menu 58 is applied to the entire document. When a user attempts to edit a portion of the electronic document, the exceptions set forth in the options 56 are consulted to determine if the user is authorized to perform the requested edit. If the user is not authorized to perform the requested edit, the request will be denied. Additional details regarding the operation of the enforcement mode will be provided in greater detail below.

Figure 5:
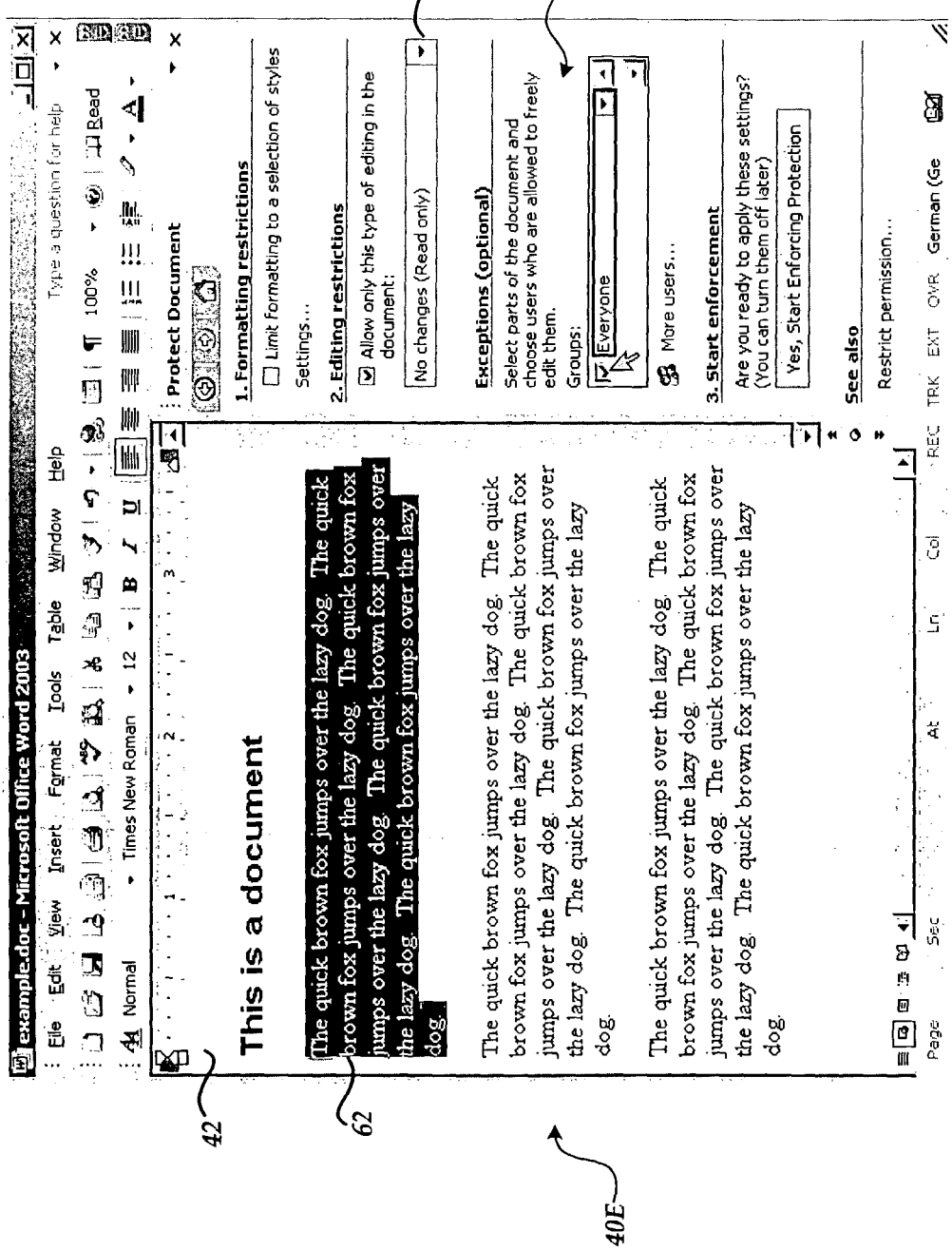

FIG. 5 illustrates the use of the exceptions option 56. As shown in FIG. 5, a user has utilized a mouse or keyboard to select a region 62 within the document workspace 42. As shown in FIG. 5, the selected region comprises an entire paragraph. However, as discussed briefly above, the selected region may comprise the entire document or any subset of the entire document as small as a single character.

In addition to selecting a region within the electronic document 8, the current user has also selected a group of users from the exceptions option 56. In particular, a group comprising every user has been selected. In this manner, all users are permitted to freely edit the selected region 62 despite the fact that the pull-down menu 58 has been selected in a manner that causes the entire document to be a read-only document.

Figure 6:
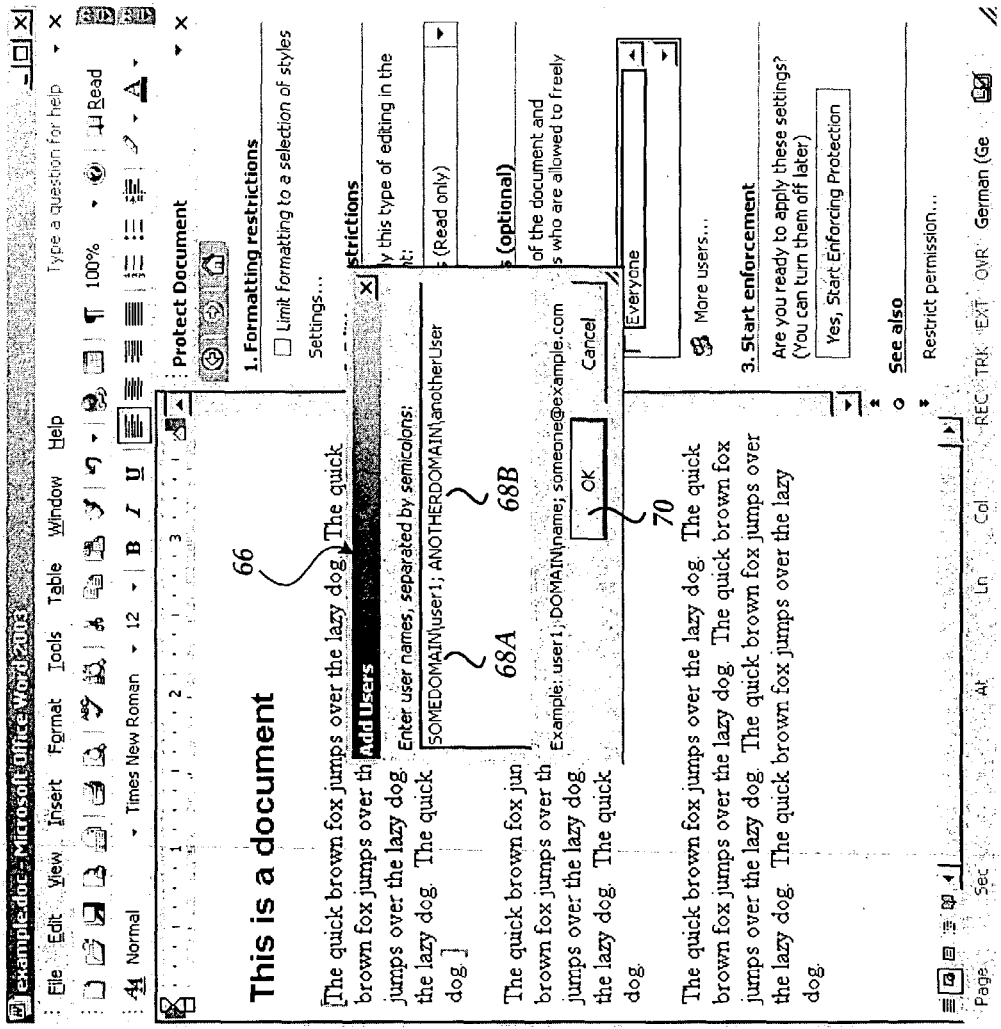

It should be appreciated that new users can be added to the exceptions list by selecting the "more users" button 64. If the "more users" button 64 is selected, a dialog box 66 may be displayed. Through the dialog box 66, a user can supply user names and addresses for additional users authorized to edit the selected region. For instance, as shown in FIG. 6, the dialog box 66 has been displayed. The current user has entered into the dialog box the identification 68A-68B of two users authorized to edit the selected region 62. Once the user has closed the dialog box 66 by selecting the button 70, the identified users are displayed in an individuals list 74. The individual names are then available for selection and can be thereby authorized to override the protection scheme applied to the entire document and to freely edit the selected region.

Figure 7:
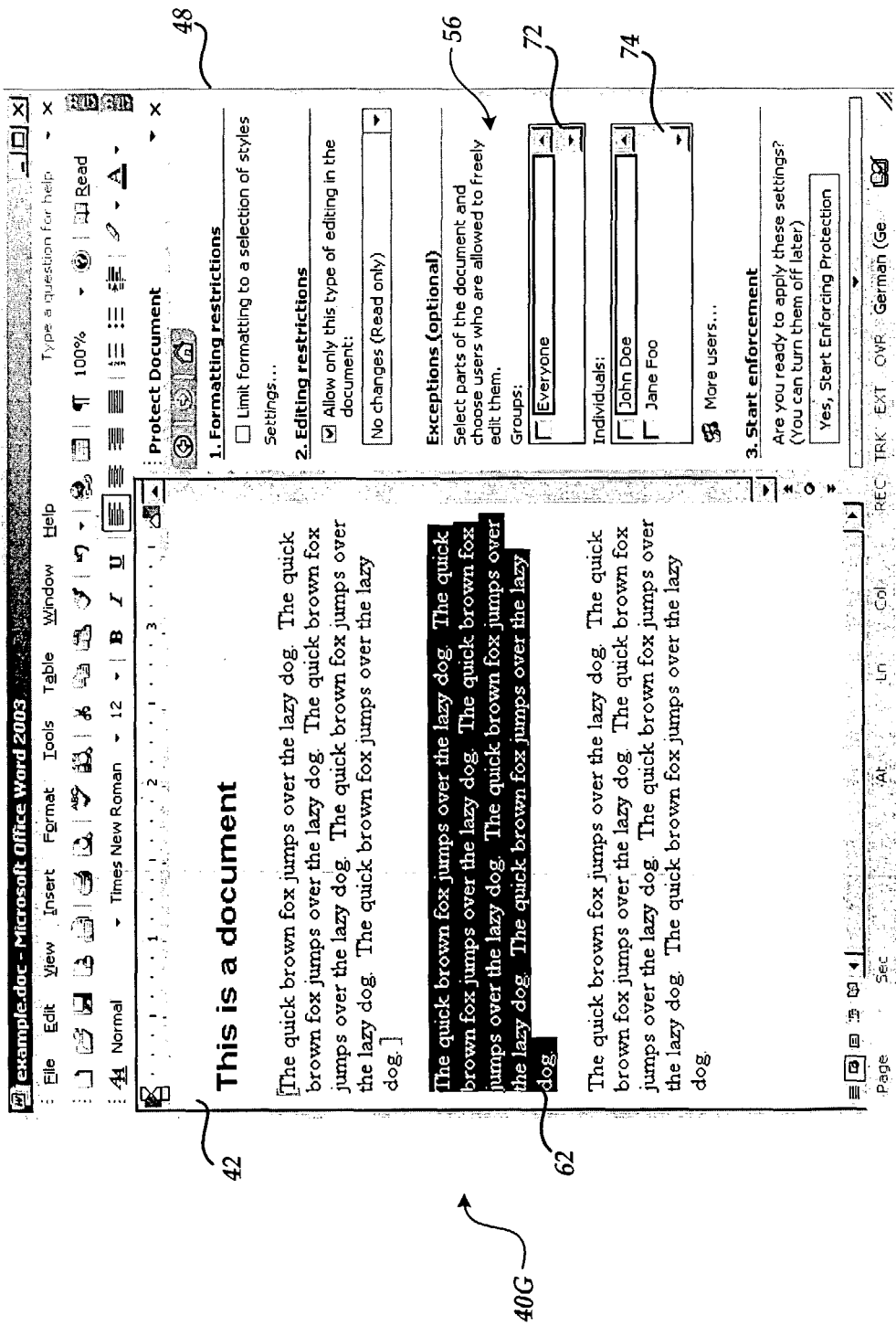
Figure 8:
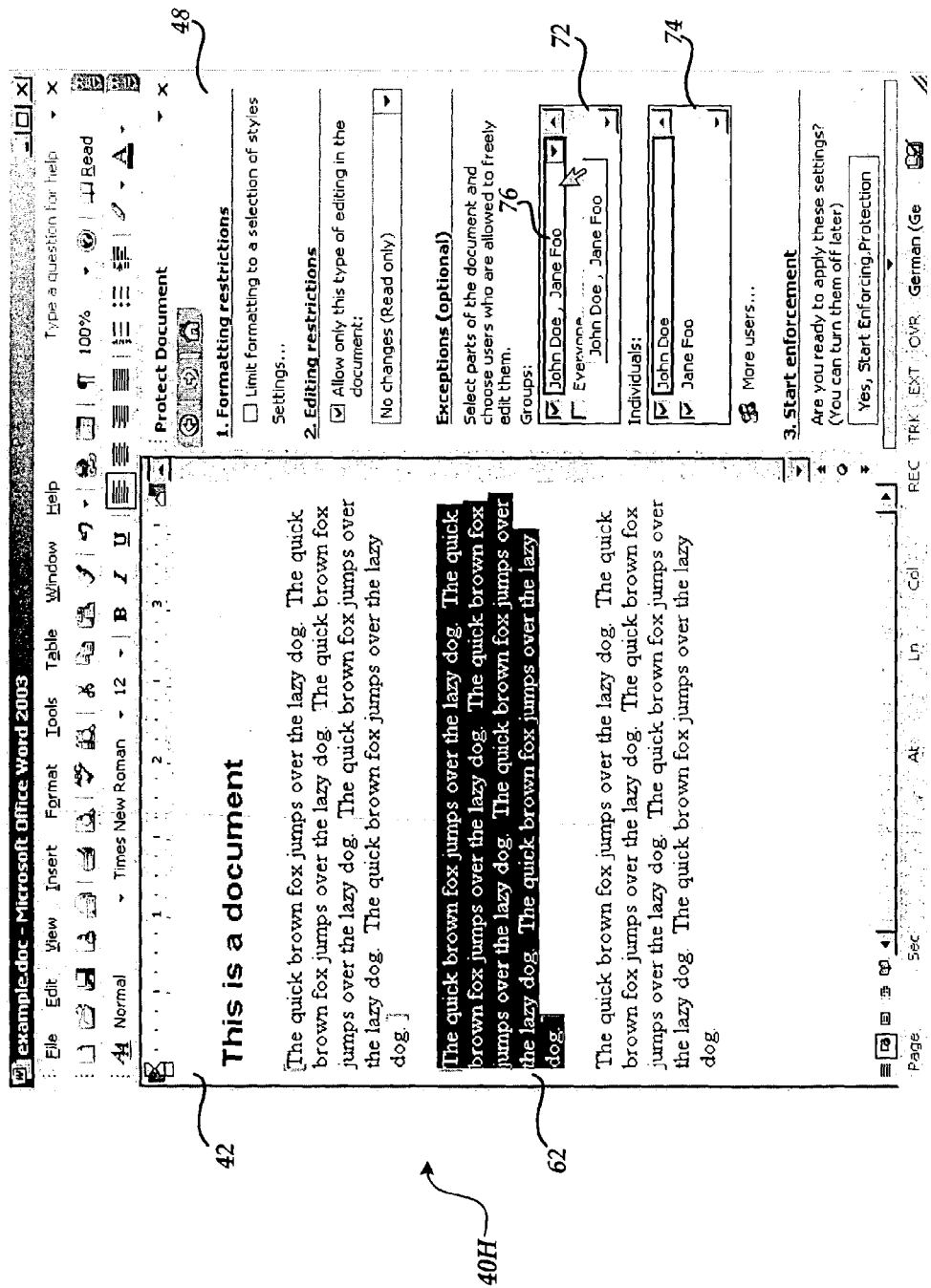

Once the individual names have been entered, an individuals list 74 is added to the task pane 48, as shown in FIG. 7. Individual names may be selected from the individuals list 74. The selected individuals are then authorized to freely edit the selected region 62. Moreover, according to the one embodiment of the invention, when more than one individual is selected from the individuals list 74 as being authorized to freely edit a selected region 62, the individuals are added as a group to the groups list 72. For instance, as shown in FIG. 8, the individuals named John Doe and Jane Foo have been selected from the individuals list 74 as authorized to edit the region 62. As a result, an entry 76 has been added to the groups list 72 identifying John Doe and Jane Foo as individuals authorized to edit the selected region 62. By automatically adding an entry to the groups list 72 when one or more individuals are selected from the individuals list 74, a user is prevented from having to individually select users each time they are added.

Figure 9:
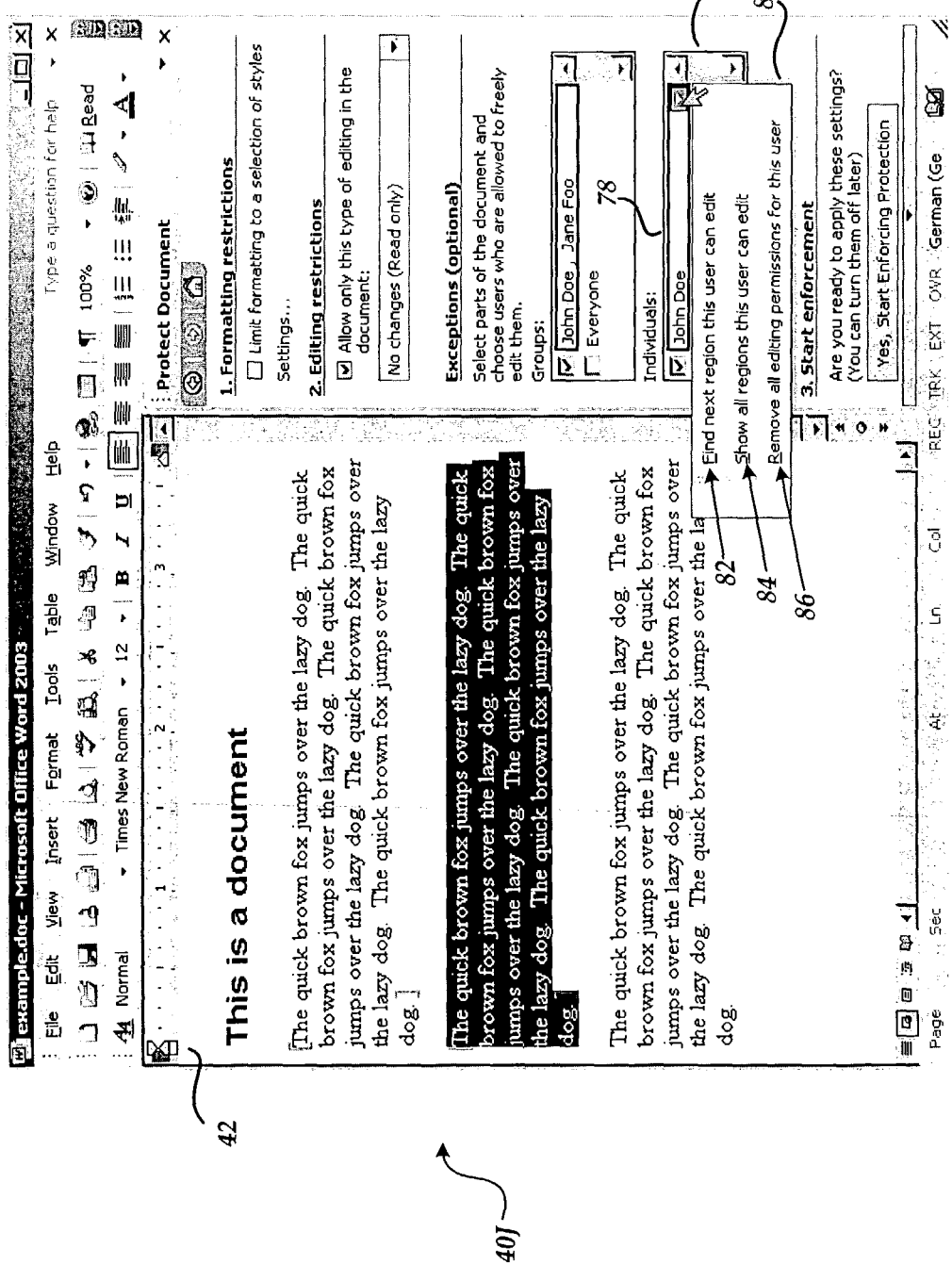

As shown in FIG. 9, a number of options are made available to a user in the administrative mode for easily determining the regions that a particular user is authorized to freely edit. In particular, a menu 80 may be accessed for each entry 78 in the individuals list 74. The menu 80 include a menu item 82 for finding the next region that the user identified in the entry 78 may edit. When selected, a search is made of the electronic document 8 currently being edited in the document workspace 42 for the next region that the user is permitted to edit. If located, the next region may be highlighted or otherwise indicated to the current user. For instance, brackets or rectangles may be drawn around the next region.

A menu item 84 may also be accessed through the menu 80 for showing all regions that the user identified by the entry 78 is permitted to freely edit. If the menu item 84 is selected, the regions that the user is permitted to edit may be identified and highlighted for display to the current user. In this manner, each of the regions that the user identified in the entry 78 is permitted to freely edit can at once be easily identified.

The menu 80 also includes a menu item 86 for removing all of the editing privileges for the user identified in the entry 78. When selected, the menu item 86 removes all editing privileges for the user in the document 8 currently being edited in the document workspace 42. Through the use of the menu item 86, all of the editing privileges for a particular user may quickly be revoked.

Figure 10:
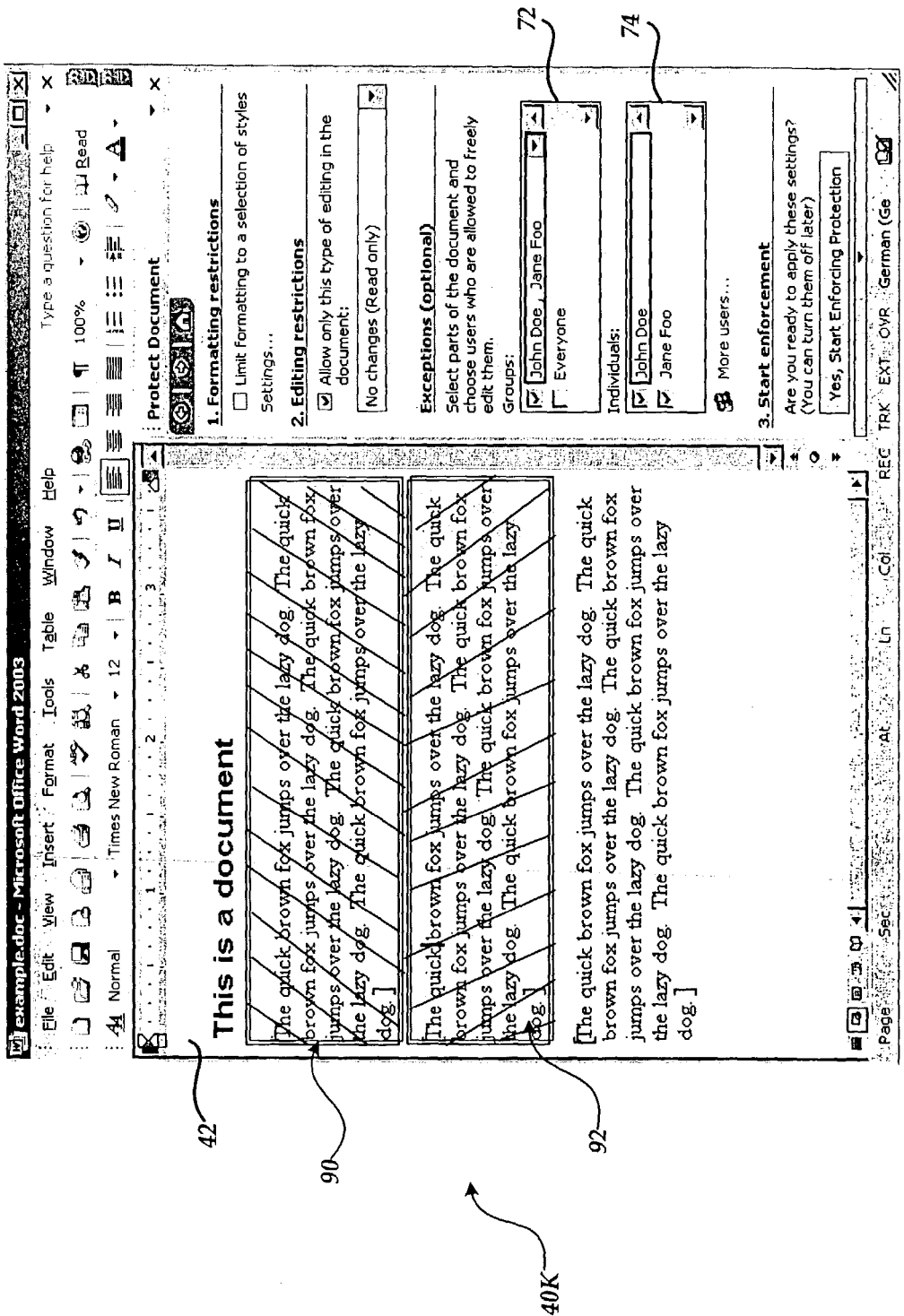

As shown in FIG. 10, each unique group of users identified in the groups list 72 is associated with a particular color. The color associated with each unique group of users is applied and displayed in conjunction with the region that the particular group of users is authorized to freely edit. Accordingly, as shown in FIG. 10, the group of users comprising "everyone" is associated with a first color (the hatched lines in FIG. 10 represent color). This color is utilized to shade the region 90 of the electronic document 8 shown within the document workspace 42. Similarly, the group of users comprising John Doe and Jane Foo is associated with a second color. This color is utilized to shade the region 92. In this manner, each unique group of users identified within the groups list 72 will be associated with a unique color and that color will be utilized to shade the regions that the groups of users is permitted to edit. The shading allows a user of the administrative mode of the word processing application program 30 to quickly identify the regions within the electronic document 8 that each group of users is permitted to edit.

Figure 11:
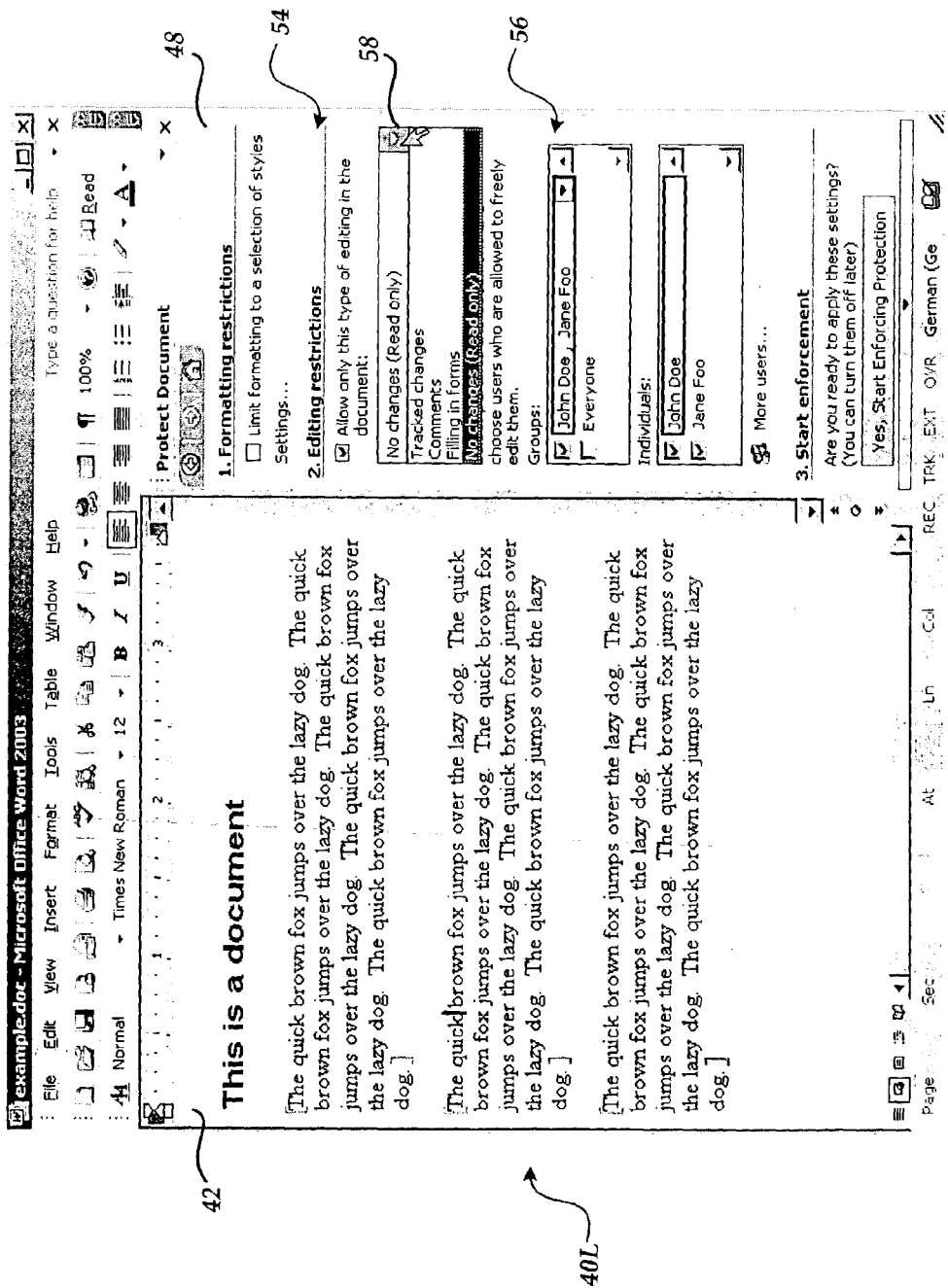

As shown in FIG. 11, the editing restrictions option 54 includes a pull-down menu 58 through which a protection scheme may be identified that is applied to the entire electronic document 8 shown in the document workspace 42. In particular, according to one embodiment of the invention, the pull-down menu 58 includes a menu item identifying a protection scheme that makes the entire electronic document 8 a read-only electronic document. In this manner, users that are not authorized to freely edit regions within the electronic document 8 through the exceptions option 56, may make no changes to the electronic document 8.

The pull-down menu 58 may also identify a protection scheme that allows only comments to be added to the entire electronic document 8. In this manner, users not authorized to freely edit regions within the electronic document may only add comments to the electronic document 8. Comments within electronic documents, such as word processing documents, are well known to those skilled in the art.

According to another embodiment of the invention, the pull-down menu 58 identifies a protection scheme that allows only the completion of forms contained within the electronic document 8. In this manner, users not otherwise authorized to freely edit regions within the electronic document 8 may only be permitted to complete forms contained within the electronic document 8. Forms within electronic documents, such as word processing documents, are also well known to those skilled in the art.

According to yet another embodiment of the invention, the pull-down menu 58 may identify a protection scheme that allows changes to be made to the electronic document 8, but that tracks each of the changes and saves the tracked changes. In this manner, users that are not otherwise authorized to edit regions within the electronic document 8 may make changes to the document, however, these changes will be tracked. It should be appreciated that other types of protection schemes may be applied to the entire document and that the protection schemes described herein are merely illustrative.

Figure 12:
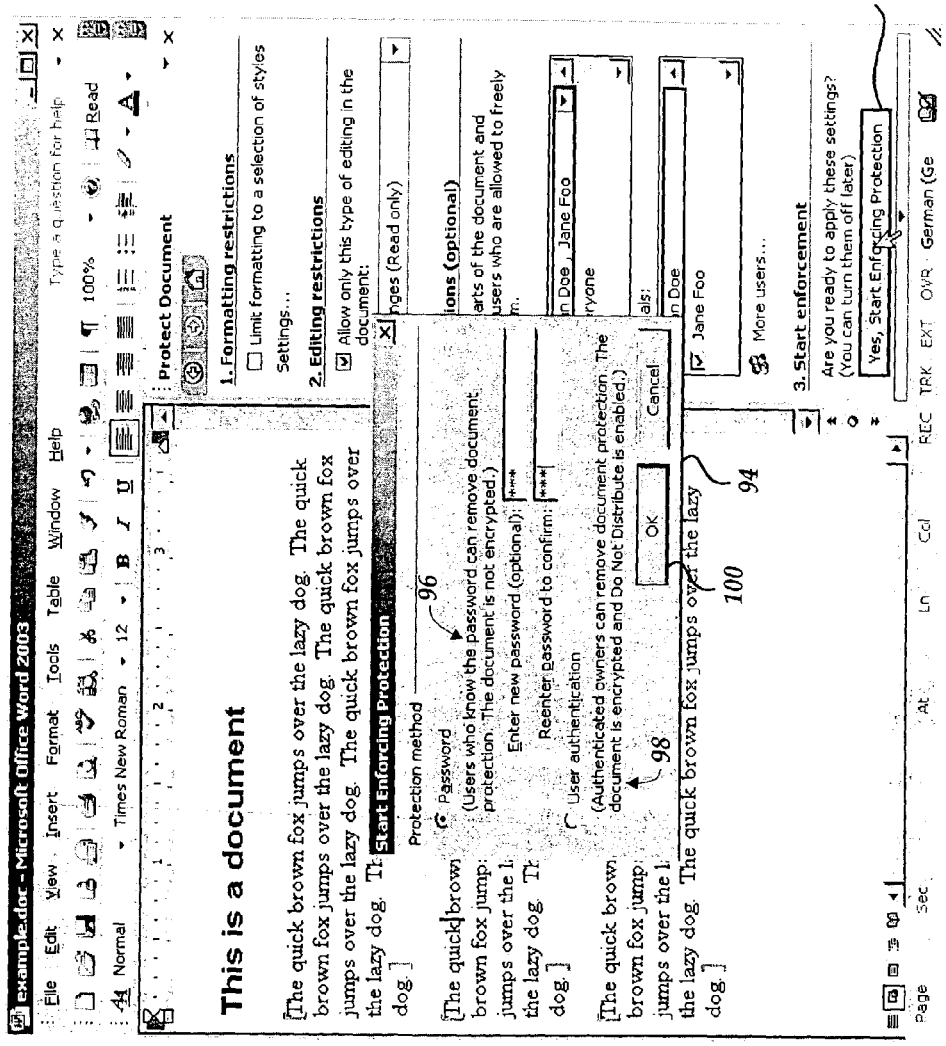

Once a user has identified a protection scheme to be applied to the entire document and specified exceptions to the protection scheme by identifying users and the regions that the users are permitted to freely edit, the user may select the button 60 to start enforcing the protection. As shown in FIG. 12, selection of the button 60 will cause a dialog box 94 to be displayed. The dialog box 94 includes an option 96 for entering a password that should be applied to the electronic document 8. Once the password is applied, the protection is applied to the document until the password is again entered.

Alternatively, according to one embodiment of the invention, the dialog box 94 may include an option 98 for authenticating owners of the electronic document 8 using a DRM authentication service 24. Authenticated owners can remove the document protection. However, users which cannot be identified through the DRM authentication service 24 as owners of the electronic document will not be permitted to disable the document protection. It should be appreciated that other types of protection schemes may be utilized to enforce the protection of the electronic document 8. Once the user has completed the entry of the dialog box 94 and selected the button 100, the word processing application program 30 enters the enforcement mode, in which the editing restrictions specified in the administrative mode are applied to the electronic document 8.

Figure 13:
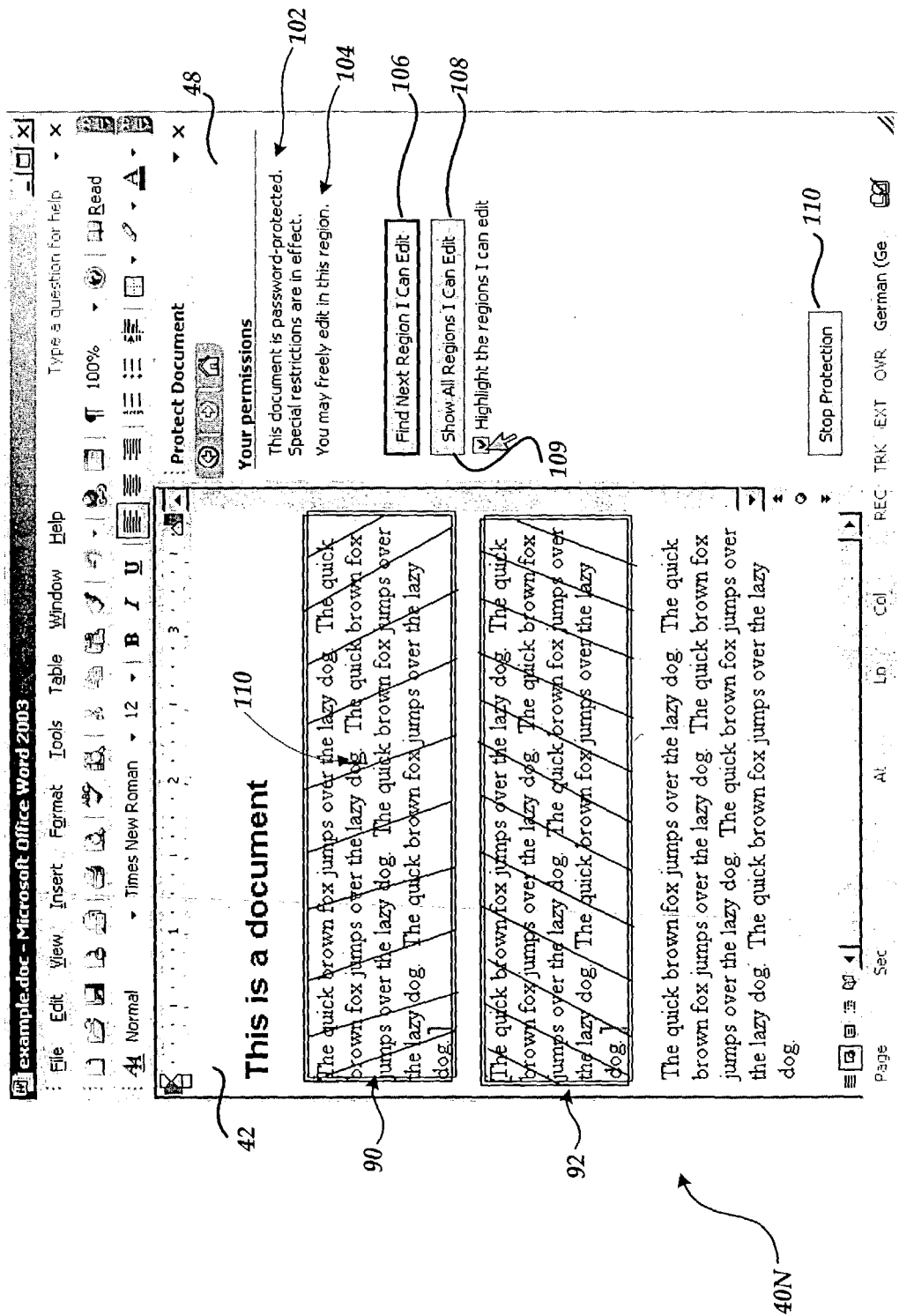

FIG. 13 shows a screen display 40N provided by the word processing application program 30 operating in the enforcement mode. In this mode, the task pane 48 display a number of options relating to the protection that has been applied to the electronic document 8. In particular, a message 102 is displayed to the current user indicating that the document is password protected and that editing restrictions may be in effect. A message 104 is also dynamically displayed to the user depending on the location of the insertion point 110. In particular, if the insertion point is located within a region that may be freely edited by the current user, the message 104 indicates that the user may freely edit within the region. However, if the insertion point 110 is located within a region of the electronic document 8 that the user is not authorized to freely edit, the message 104 will indicate that the user is not permitted to edit in the particular region.

According to one embodiment of the invention, the task pane 48 also includes a button 106 that, when pressed, locates and identifies to the user the next region within the electronic document 8 that the current user is authorized to freely edit. In this manner, the user can quickly identify those locations within the electronic document 48 that they are authorized to edit. When pressed, the button 108 will display to the user each of the regions within the electronic document 8 that the user is authorized to edit. A checkbox 109 may also be provided to the user that, when selected, highlights to the user each of the regions that the user is permitted to edit. As shown in FIG. 13, the regions 90 and 92 have been highlighted to the user as regions capable of being edited. All other regions of the electronic document 8 shown within the document workspace 42 are uneditable by the current user.

Figure 14:
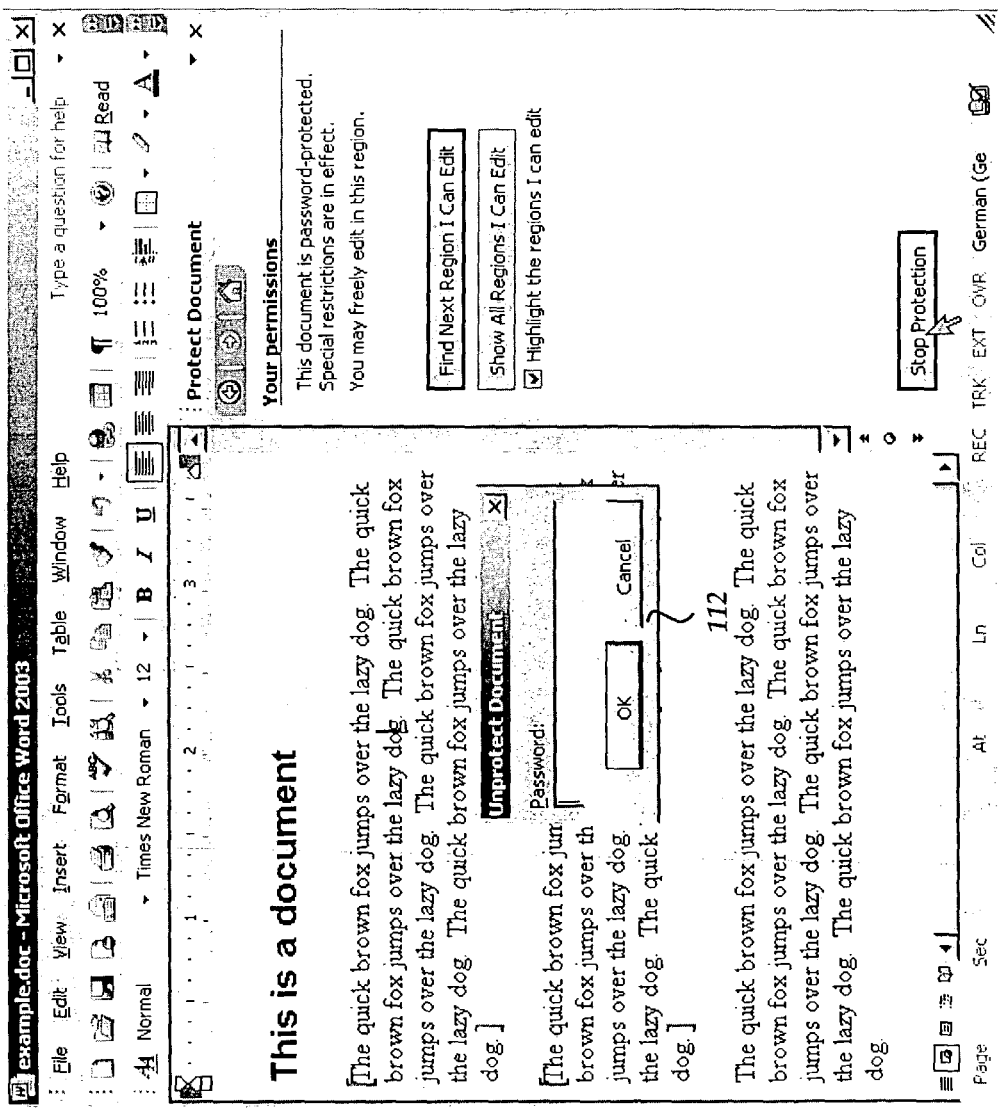

A button 110 is also provided in the task pane 48 which, when pressed, will allow the user to exit the enforcement mode and stop the protection of the electronic document 8. If the button 110 is pressed, the user is presented with a dialog box 112 shown in FIG. 14. The user must then enter the password that was associated with the document when protection was started. If the user can enter the correct password, the document will return to an unprotected state. Alternatively, if DRM protection was utilized to protect the electronic document, the current user must be authorized as an owner of the electronic document 8 before the protection will be stopped.

The logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

Figure 15:
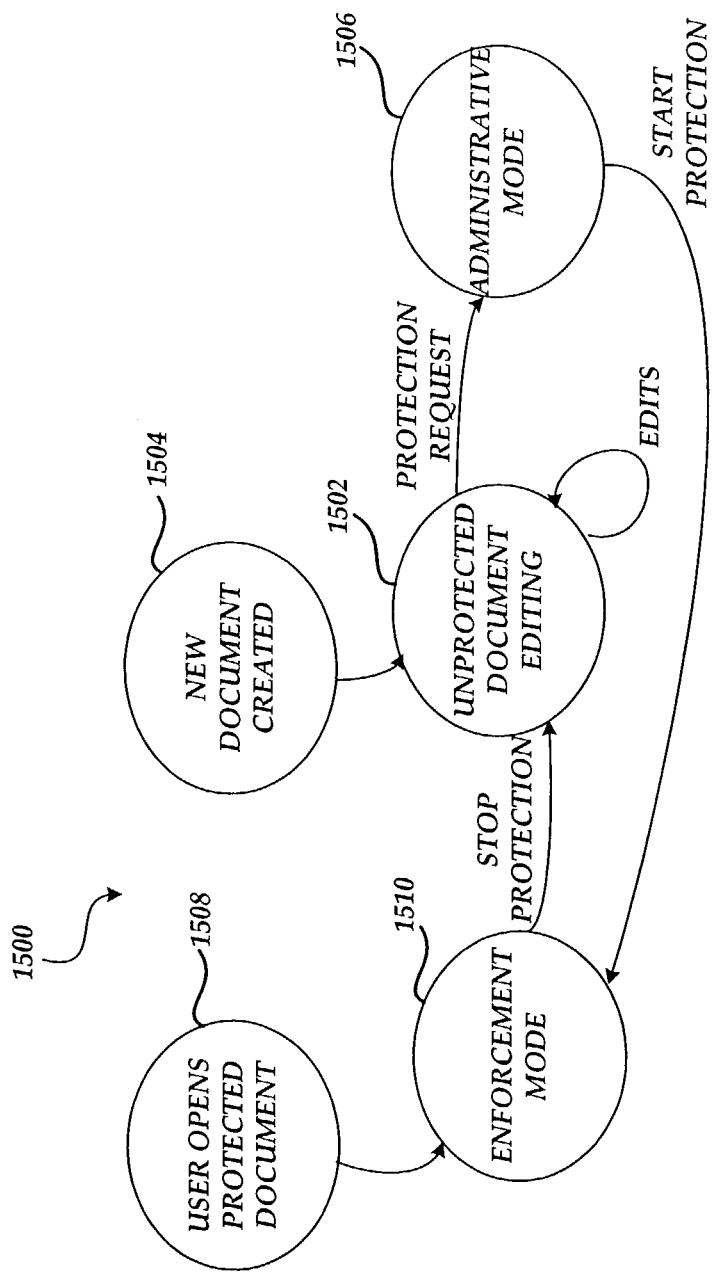
FIG. 15 is a state diagram illustrating the operation of an enforcement mode and an administrative mode utilized in one embodiment of the invention.

Referring now to FIG. 15, a state diagram 1500 will be described that illustrates the operation of the word processing application program 30 with respect to the protection of regions of an electronic document. The state machine 1500 begins in either state 1508 or state 1504. In particular, state 1508 is entered when a user opens a protected document. From state 1508, the state machine 1500 transitions to state 1510, where the enforcement mode is entered by the word processing application program 30.

As described above, in the enforcement mode the word processing application program is operative to receive a request to edit a region of the electronic document from a current user, to determine whether the user is authorized to edit the region, and to deny the request to edit the region in response to determining that the current user is not authorized to edit the particular region. In the enforcement mode 1510, the word processing application program 30 may also receive a request to stop the protection of the electronic document. As described briefly above, the user may then be prompted for a password or authenticated as an owner of the electronic document. If the user can be authenticated as an owner of the electric document or provides the correct password, the state machine 1500 transitions from state 1510 to state 1502.

The state machine 1500 may also begin at state 1504 when a new document is created. When a new document is created, the document is unprotected and therefore the state machine 1500 transitions to state 1502. In the unprotected document editing state 1502, edits may be freely made to the electronic document. If a request to protect the electronic document is received, the task pane 48 described above with reference to FIGS. 4A-14 may be displayed and the word processing application program 30 may enter the administrative state 1506.

Once the protection scheme to be applied to the entire document has been specified and any exceptions to the protection scheme have been identified for various users, a request to start protecting the electronic document may be received. If such as a request is received, the state machine transitions from state 1506 to state 1510, where the protection is enforced. Additional details regarding the operation of the administrative mode at state 1506 are described in greater detail below with reference to FIG. 16. Additional details regarding the operation of the enforcement mode at state 1510 are provided below with reference to FIG. 17.

Figure 16:
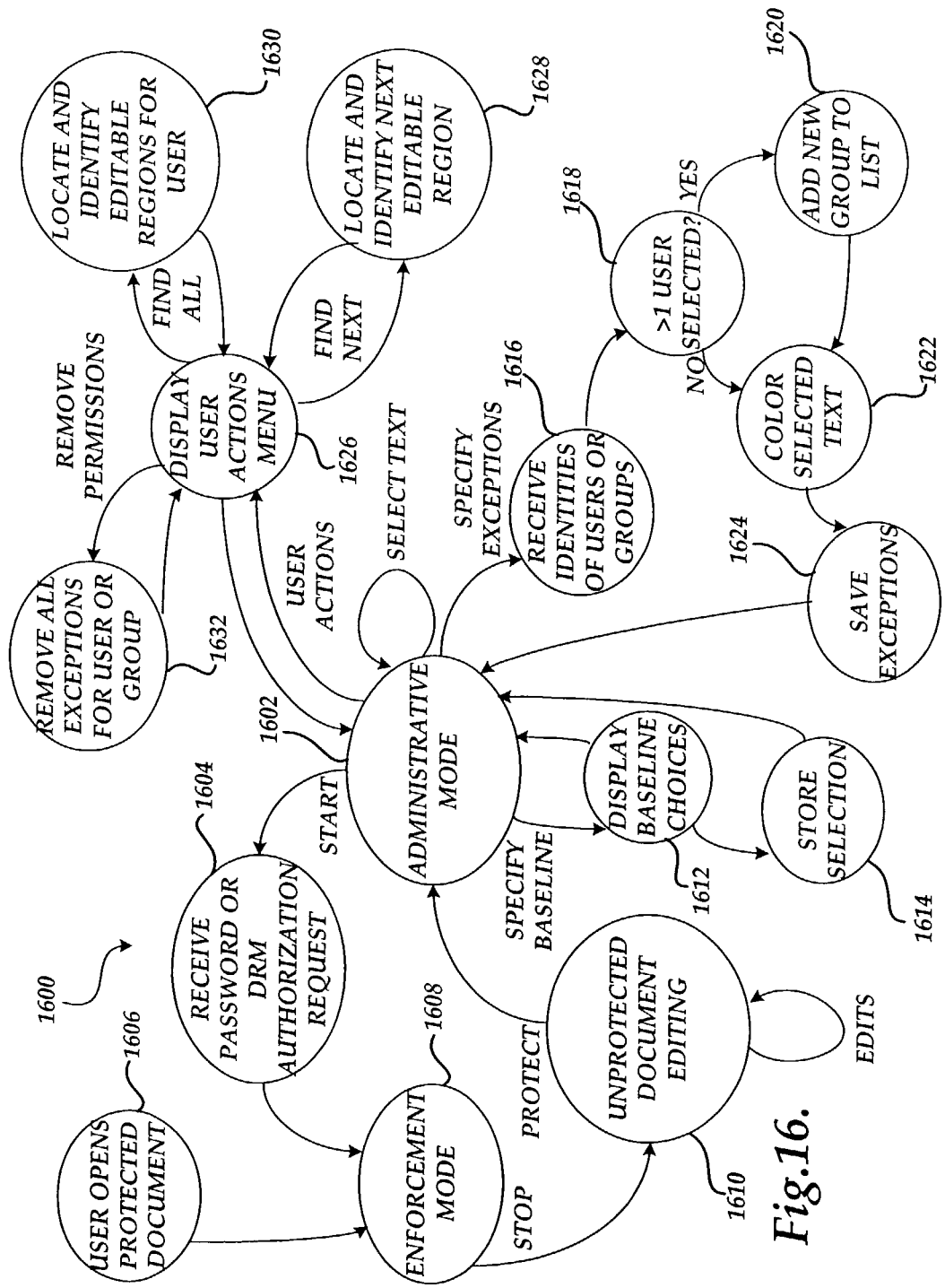
FIG. 16 is state diagram illustrating various aspects of an administration mode utilized in one embodiment of the invention.

Referring now to FIG. 16, a state machine 1600 will be described that illustrates additional aspects of the administrative mode provided by the word processing application program 30. In particular, the state machine 1600 begins at state 1602. State 1602 comprises the administrative mode provided by the word processor application program and is entered when a user makes a request to protect a document through the menu 50 described with reference to FIG. 3A. In the administrative mode, a user can specify a protection scheme to be applied to the entire electronic document. In particular, a pull-down menu 58 may be displayed to the user indicating the protection schemes that may be applied to the entire document. The protection scheme may also be described herein as a baseline protection mode that may be applied to the entire document. If a user wishes to specify the baseline protection scheme, the statement machine 1600 transitions to state 1612, where the pull-down menu 58 is displayed. If the user selects one of the protection schemes, the state machine transitions to state 1614, where the selection is stored. If the user does not select one of the protection schemes, the state machine transitions back to state 1602.

As discussed above, a user may also specify exceptions to the protection scheme. In order to specify exceptions, the user first selects text within the electronic document 8 while in the state 1602. The state machine then transitions to state 1616, where a user specifies the identities of users or groups that are freely authorized to edit the selected text. From state 1616, the state machine transitions to state 1618, where a determination is made as to whether more than one user has been selected in the individuals list 74. If more than one user has been selected, the state machine transitions from state 1618 to state 1620, where a new group is added to the groups list 72 comprising the individuals that were selected from the individuals list 74. In this manner, new groups are added to the groups list 72 each time more than one individual is selected from the individuals list 74 and authorized to freely edit a region within the electronic document 8.

If more than one user has not been selected, the state machine transitions from state 1618 to state 1622, where the selected text is colored. As discussed above, a unique color is assigned to each unique group of individuals contained in the groups list 72 and that color is utilized to shade the regions of the electronic document 8 that the users are permitted to edit. In this manner, the areas which unique groups of users are permitted to freely edit may be easily identified to the user. From state 1622, the state machine 1600 transitions to state 1624, where each of the exceptions specified at state 1616 are saved. The state machine then transitions back to state 1602.

As discussed above with respect to FIG. 9, a menu 80 may be displayed with respect to each individual identified within the individuals list 74. If the menu 80 is selected, the state machine 1600 transitions to state 1626. The individual menu items 82, 84, or 86 may then be selected to perform various functions. In particular, if the menu item 82 is selected for finding the next region the selected user can edit, the state machine 1600 transitions from state 1626 to state 1628. At state 1628, the next region that the selected user is authorized to freely edit is located and identified to the user. In particular, the region may be highlighted or otherwise displayed in a manner that indicates to the user the particular region. From state 1628, the state machine 1600 returns to state 1626.

If the menu item 84 is selected from the menu 80, the state machine 1600 transitions from state 1626 to state 1630. At state 1630, all of the regions that the selected user is authorized to freely edit are located. These regions are then identified by highlighting or otherwise indicating the appropriate regions. The state machine 1600 then transitions from state 1630 to state 1626.

If the menu item 86 is selected from the menu 80, the state machine 1600 transitions from state 1626 to state 1632. At state 1632, all of the exceptions specified for the selected user or group are removed. The state machine 1600 then transitions from state 1636 to state 1626. When the user has completed use of the menu 80, the menu is removed and the state machine 1600 transitions back from state 1626 to state 1602.

While in state 1602, a user may select the button 60 to start enforcing protection of the electronic document. If this button 60 is selected, the state machine 1600 transitions from state 1602 to state 1604, where a password is received from the user for protecting the electronic document 8. As discussed above, the DRM authentication service 24 may be utilized to ensure that protection may only be stopped by authenticated owners of electronic document 8.

From state 1604, the state machine 2600 transitions to state 1608, where the enforcement mode is entered. Alternatively, the state machine 1600 may transition to state 1608 from state 1606 when a user opens a protected document. In the enforcement mode, a user may stop protection of the electronic document 8 by providing the correct password or authenticating themselves as an owner of the electronic document. In this case, the state machine 1600 transitions from state 1608 to state 1610. At state 1610, the document is unprotected and edits may be freely made to the entire electronic document. While in the unprotected document editing state 1610, a user request may again be made to protect the electronic document through the menu item 52 displayed in the menu 50. In this case, the state machine 1600 again enters the administrative mode by transitioning from state 1610 to state 1602. Additional details regarding the operation of the enforcement mode 1608 will be described in greater detail below with respect to FIG. 17.

Figure 17:
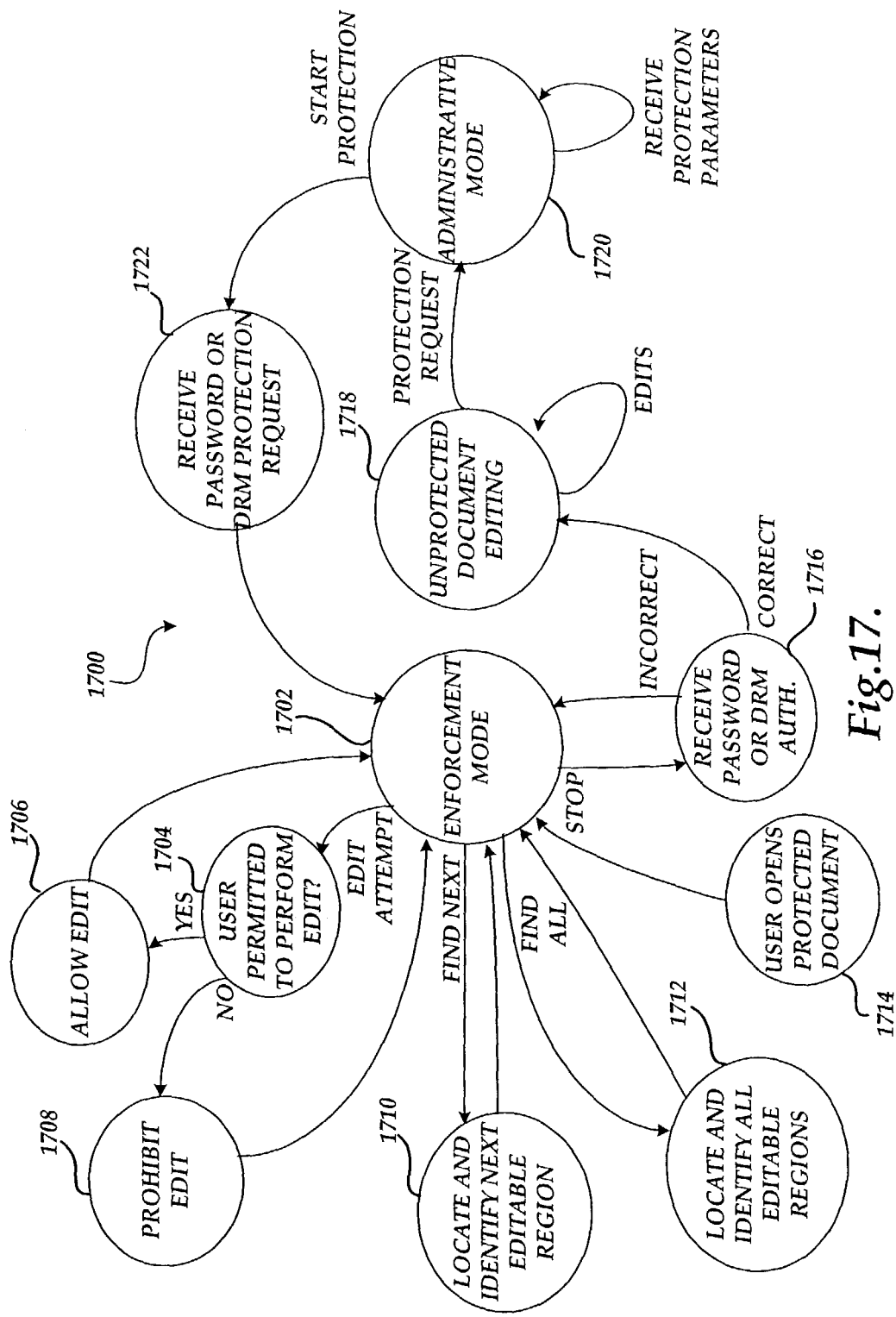
FIG. 17 is a state diagram illustrating various aspects of an enforcement mode utilized in the various embodiments of the present invention.

Turning now to FIG. 17, a statement machine 1700 will be described that illustrates additional details regarding the enforcement mode utilized by the word processing application program 30. As described briefly above, unprotected documents may be freely edited in an unprotected document editing state 1718. In this state, a request may also be made to protect the electronic document. If such a request is made, the state machine 1700 transitions from state 1718 to state 1720. State 1720 is the administrative mode through which various protection parameters may be received from a user. As discussed above, in particular, a user may specify a protection scheme to be applied to the entire document and also identify regions within the document that may be freely edited by users or groups. From the administrative mode, a user may request that the protection be applied to the document. In this case, the state machine transitions from state 1720 to state 1722, where a password is received for protecting the document or a request to protect the electronic document 8 utilizing DRM protection. The state machine then transitions from state 1722, to state 1702.

State 1702 comprises the enforcement mode provided by the word processing application program 30. In the enforcement mode, the user may request to edit a region within the electronic document. When such a request is made, the state machine transitions from state 1702 to state 1704. At state 1704, a determination is made at to whether the user is authorized to perform the edit of the selected region. The identity of the current user may be determined through various means. For instance, according to the various embodiments of the invention, the identity of the current user may be identified by using MICROSOFT WINDOWS validation, using PASSPORT technology from the MICROSOFT CORPORATION, or by using an ACTIVEDIRECTORY server, also from MICROSOFT. Other methods for validating the identity of a user through software programs from other vendors may also be utilized. If the user has been authorized to perform the edit in the administrative mode, the state machine transitions to state 1706, where the requested edit is permitted. From state 1706, the state machine transitions back to state 1702.

According to one embodiment of the invention, when in the enforcement mode, only the regions of the document that may be freely edited by the current user may be displayed. Other regions of the document not freely editable by the current user may be displayed as blocks, unrecognizable text, or in another manner designed to completely obscure the subject matter contained in the uneditable regions of the electronic document.

If the user has not been authorized to perform the edit in the selected region, the state machine 1700 transitions to state 1708, where the requested edit is prohibited. The task pane 48 may also be displayed if not visible already. The state machine then transitions from state 1708 back to state 1702. In this manner, a user is only permitted to edit the electronic document 8 to the extent permitted by the protection scheme applied to the entire document and to the extent specified by the owner of the electronic document in the administrative mode.

As discussed above with reference to FIGS. 13 and 14, the task pane 48 provides to the user a number of options while in the enforcement mode. Accordingly, through the options presented in the task pane 48, a user may request to locate the next region that they are permitted to freely edit. If a user makes such a request, the state machine 1700 transitions from state 1702 to state 1710. At state 1710, the next region that may be freely edited by the current user is located and identified to the user through highlighting or another mechanism. The state machine 1700 then returns to state 1702.

The user may also request to locate all of the regions within the electronic document 8 that the user is authorized to freely edit. In this case, the state machine 1700 transitions from state 1702 to state 1712. At state 1712, each of the regions within the electronic document 8 that the user is authorized to freely edit are located and identified to the user. The state machine 1700 then transitions back to state 1702.

Through options presented in the task pane 48, the user may also request to stop protection of the electronic document. In this case, the state machine 1700 transitions from state 1702 to state 1716, where a password is received from the user or an attempt is made to authorize the user as an authenticated owner of the document. If the password is incorrect or if the user cannot be authenticated, the state machine returns to state 1702 where operation in the enforcement mode continues. If, however, the password is correct or the user can be authenticated as an owner of the document, the state machine 1700 transitions from state 1716 to the unprotected document editing mode in state 1718.

Based on the foregoing, it should be appreciated that the enforcement mode 1702 can be entered from the administrative mode by providing a request that the document be protected and a password or a DRM protection request. Alternatively, the enforcement mode may also be entered at state 1714, when a user opens a previously protected document. From state 1714, the state machine 1700 transitions to state 1702, where the enforcement mode is entered.

Based on the foregoing, it should be appreciated that the various embodiments of the invention provide a method, system, apparatus, computer-readable medium for protecting regions of an electronic document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method comprising:
creating an electronic document in an unprotected editing state that enables unrestricted editing to the electronic document;
in response to receiving a state change request to change a state of the electronic document from the unprotected editing state to a protected editing state, displaying an administrative mode through a graphical user interface, wherein the administrative mode enables setting of at least one protection scheme applicable to one or more portions of the electronic document;
in the administrative mode, setting the protection scheme for the one or more portions of the electronic document based on received input from a user;
receiving a protection request to set the electronic document in the protected editing state;
based on the received protection request, setting the electronic document in the protected editing state; and
in response to setting the electronic document in the protected editing state, transitioning from the administrative mode to an enforcement mode where the electronic document is viewable in accordance with the protected editing state.

2. The computer-implemented method according to claim 1, wherein the user is authenticated as an owner of the electronic document upon at least one of the receipt of the state change request and receipt of the protection request.

3. The computer-implemented method according to claim 1, wherein the setting of the protection scheme further comprises setting exceptions to the protection scheme based on received input that selects a portion of the electronic document and specifies one or more users that are permitted to edit the selected portion of the electronic document.

4. The computer-implemented method according to claim 3, wherein the setting of the exceptions to the protection scheme further comprises creating at least one user group for one or more users that are permitted to edit the selected portion of the electronic document.

5. The computer-implemented method according to claim 4, wherein the creating of the user group further comprises assigning a unique indicator to the created user group, and wherein the unique indicator is viewable in the enforcement mode to identify portions of the electronic document that are editable by a user.

6. The computer-implemented method according to claim 1, wherein the setting of the protection scheme further comprises receiving a selection of the at least one protection scheme from a listing of a plurality of protection schemes, wherein the plurality of protection schemes comprise:
- a first protection scheme that makes the one or more portions of the electronic document read-only,
- a second protection scheme allowing only comments to be added to the one or more portions of the electronic document,
- a third protection scheme allowing only a completion of a form contained within the one or more portions of the electronic document,
- a fourth protection scheme displaying only a portion of the selected region of the document that may be edited, and
- a fifth protection scheme tracking changes made in the electronic document.

7. The computer-implemented method according to claim 1, further comprising receiving, in the enforcement mode, an access request for access to the electronic document in the protected editing state, authenticating a user associated with the access request, and displaying only portions of the electronic document that the authenticated user is authorized to freely edit.

8. A system comprising:
at least one processor; and
a memory operatively connected with the at least one processor, the memory comprising computer executable instructions that, when executed by the at least one processor, performs a method comprising:
- creating an electronic document in an unprotected editing state that enables unrestricted editing to the electronic document,
- in response to receiving a state change request to change a state of the electronic document from the unprotected editing state to a protected editing state, displaying an administrative mode through a graphical user interface, wherein the administrative mode enables setting of at least one protection scheme applicable to one or more portions of the electronic document,
- in the administrative mode, setting the protection scheme for the one or more portions of the electronic document based on received input from a user,
- receiving a protection request to set the electronic document in the protected editing state,
- based on the received protection request, setting the electronic document in the protected editing state, and
- in response to setting the electronic document in the protected editing state, transitioning from the administrative mode to an enforcement mode where the electronic document is viewable in accordance with the protected editing state.

9. The system according to claim 8, wherein the user is authenticated as an owner of the electronic document upon at least one of the receipt of the state change request and receipt of the protection request.

10. The system according to claim 1, wherein the setting of the protection scheme further comprises setting exceptions to the protection scheme based on received input that selects a portion of the electronic document and specifies one or more users that are permitted to edit the selected portion of the electronic document.

11. The system according to claim 10, wherein the setting of the exceptions to the protection scheme further comprises creating at least one user group for one or more users that are permitted to edit the selected portion of the electronic document.

12. The system according to claim 11, wherein the creating of the user group further comprises assigning a unique indicator to the created user group, wherein the unique indicator is viewable in the enforcement mode to identify portions of the electronic document that are editable by a user.

13. The system according to claim 8, wherein the setting of the protection scheme further comprises receiving a selection of the at least one protection scheme from a listing of a plurality of protection schemes, wherein the plurality of protection schemes comprise:
- a first protection scheme that makes the one or more portions of the electronic document read-only,
- a second protection scheme allowing only comments to be added to the one or more portions of the electronic document,
- a third protection scheme allowing only a completion of a form contained within the one or more portions of the electronic document,
- a fourth protection scheme displaying only a portion of the selected region of the document that may be edited, and
- a fifth protection scheme tracking changes made in the electronic document.

14. The system according to claim 8, wherein the executed operations further comprising receiving, in the enforcement mode, an access request for access to the electronic document in the protected editing state, authenticating a user associated with the access request, and displaying only portions of the electronic document that the authenticated user is authorized to freely edit.

15. A computer-readable storage device including executable instructions, that when executed on at least one processor, causing the processor to perform a method comprising:
- creating an electronic document in an unprotected editing state that enables unrestricted editing to the electronic document;
- in response to receiving a state change request to change a state of the electronic document from the unprotected editing state to a protected editing state, displaying an administrative mode through a graphical user interface, wherein the administrative mode enables setting of at least one protection scheme applicable to one or more portions of the electronic document;
- in the administrative mode, setting the protection scheme for the one or more portions of the electronic document based on received input from a user;
- receiving a protection request to set the electronic document in the protected editing state;
- based on the received protection request, setting the electronic document in the protected editing state; and
- in response to setting the electronic document in the protected editing state, toggling from the administrative mode to an enforcement mode where the electronic document is viewable in accordance with the protected editing state.

16. The computer-readable storage device according to claim 15, wherein the user is authenticated as an owner of the electronic document upon at least one of the receipt of the state change request and receipt of the protection request.

17. The computer-readable storage device according to claim 15, wherein the setting of the protection scheme further comprises setting exceptions to the protection scheme based on received input that selects a portion of the electronic document and specifies one or more users that are permitted to edit the selected portion of the electronic document.

18. The computer-readable storage device according to claim 17, wherein the setting of the exceptions to the protection scheme further comprises creating at least one user group for one or more users that are permitted to edit the selected portion of the electronic document and assigning a unique indicator to the created user group, and wherein the unique indicator is viewable in the enforcement mode to identify portions of the electronic document that are editable by a user.

19. The computer-readable storage device according to claim 15, wherein the setting of the protection scheme further comprises receiving a selection of the at least one protection scheme from a listing of a plurality of protection schemes, wherein the plurality of protection schemes comprise:
   a first protection scheme that makes the one or more portions of the electronic document read-only,
   a second protection scheme allowing only comments to be added to the one or more portions of the electronic document,
   a third protection scheme allowing only a completion of a form contained within the one or more portions of the electronic document,
   a fourth protection scheme displaying only a portion of the selected region of the document that may be edited, and
   a fifth protection scheme tracking changes made in the electronic document.

20. The computer-readable storage device according to claim 15, wherein the method further comprising receiving, in the enforcement mode, an access request for access to the electronic document in the protected editing state, authenticating a user associated with the access request, and displaying only portions of the electronic document that the authenticated user is authorized to freely edit.

* * * * *